(12) United States Patent
Kawabe et al.

(10) Patent No.: US 6,905,165 B2
(45) Date of Patent: Jun. 14, 2005

(54) VEHICLE FLOOR STRUCTURE

(75) Inventors: Satoru Kawabe, Wako (JP); Toshizumi Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/716,126

(22) Filed: Nov. 17, 2003

(65) Prior Publication Data

US 2004/0100126 A1 May 27, 2004

(30) Foreign Application Priority Data

Nov. 22, 2002 (JP) .................................. 2002-339197

(51) Int. Cl.⁷ .............................................. B62D 21/02
(52) U.S. Cl. ........................... 296/193.07; 296/187.08; 296/209
(58) Field of Search ..................... 296/193.07, 187.01, 296/187.03, 187.08, 187.09, 187.1, 203.01, 204, 203.02, 203.03; 180/311

(56) References Cited

U.S. PATENT DOCUMENTS

| | | | | |
|---|---|---|---|---|
| 3,481,643 A | * | 12/1969 | Campbell | 296/204 |
| 4,545,172 A | * | 10/1985 | Wardill | 52/783.14 |
| 4,631,891 A | * | 12/1986 | Donavich | 52/588.1 |
| 4,966,082 A | * | 10/1990 | Takeichi et al. | 105/422 |
| 5,020,846 A | * | 6/1991 | Bonnett | 296/181.4 |
| 5,730,486 A | * | 3/1998 | Jurica | 296/184.1 |
| 5,772,276 A | * | 6/1998 | Fetz et al. | 296/181.6 |
| 6,408,586 B1 | * | 6/2002 | Deckert | 52/630 |
| 6,547,280 B1 | * | 4/2003 | Ashmead | 280/751 |
| 2001/0028179 A1 | * | 10/2001 | Takemoto et al. | 296/204 |

FOREIGN PATENT DOCUMENTS

| | | | | |
|---|---|---|---|---|
| DE | 3115699 | * | 10/1982 | |
| DE | 19718786 | * | 11/1997 | |
| GB | 2140750 | * | 12/1984 | 296/178 |
| JP | 357110567 A | * | 7/1982 | 180/311 |
| JP | 401119481 | * | 5/1989 | 296/901.01 |
| JP | 07323476 | * | 12/1995 | |
| JP | 2000135990 A | | 5/2000 | |
| JP | 2003220978 | * | 8/2003 | |

* cited by examiner

*Primary Examiner*—H. Gutman
(74) *Attorney, Agent, or Firm*—Merchant & Gould P.C.

(57) ABSTRACT

A vehicle floor structure is provided in which a plurality of cross-members are extended between left and right floor frame members at predetermined longitudinal intervals, and a floor panel is mounted to the left and right floor frame members and the crossmembers. A corrugated sheet having a plurality of longitudinally oriented ridges is disposed in a space formed by the left and right floor frame members and the crossmembers. Left and right side portions of the corrugated sheet are connected to the left and right floor frame members. Front and rear edge portions of the corrugated sheet are connected to opposite ones of the crossmembers. If the right floor frame member, for example, is subjected to a load upon an offset collision of the vehicle, the load is transmitted to the left floor frame via the corrugated sheet for dispersion.

4 Claims, 21 Drawing Sheets

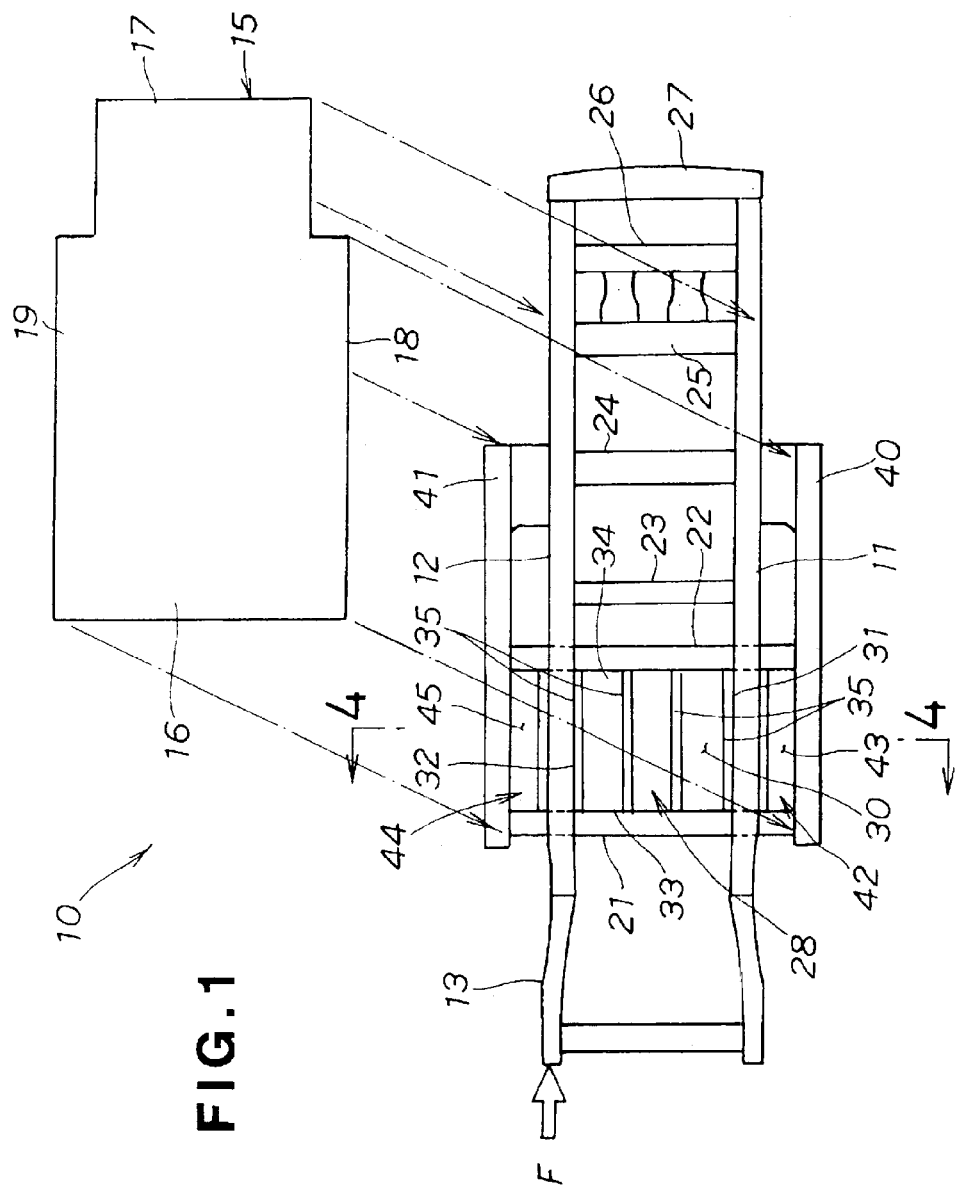

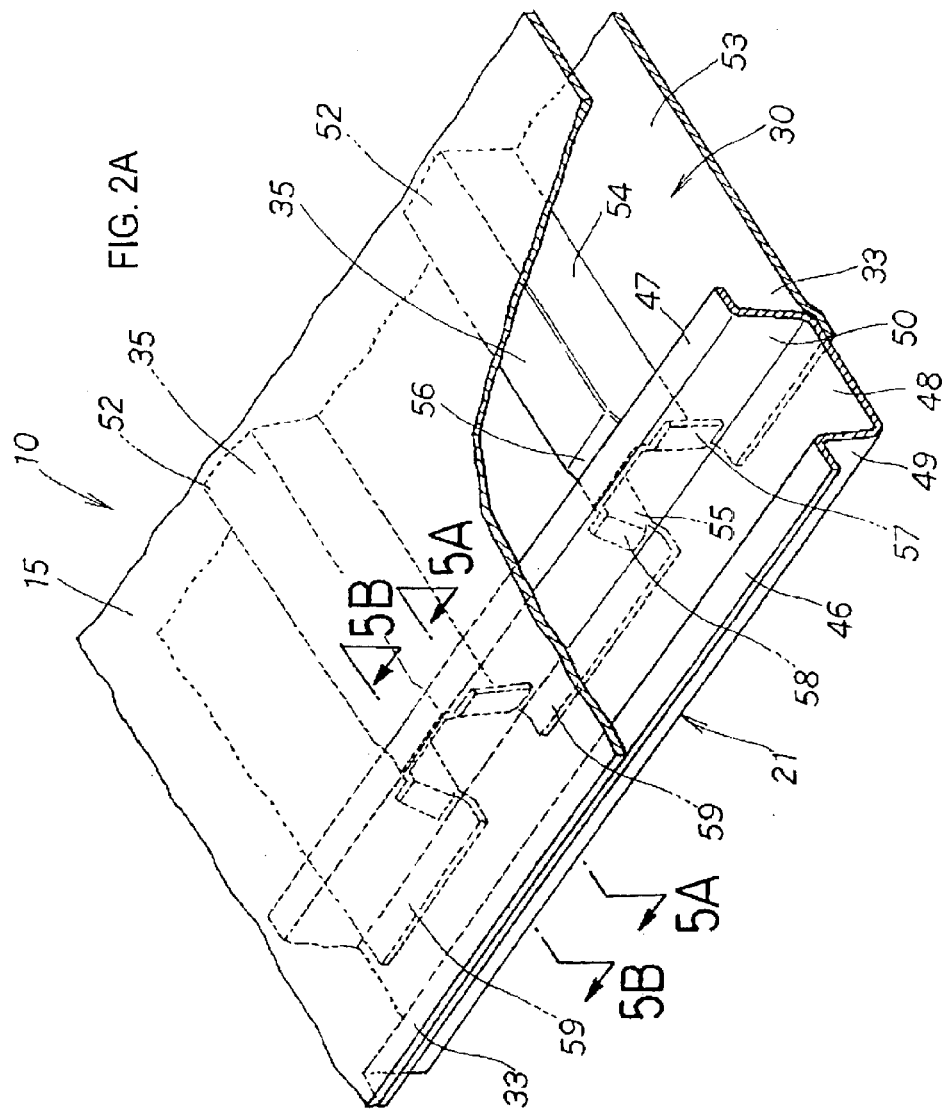

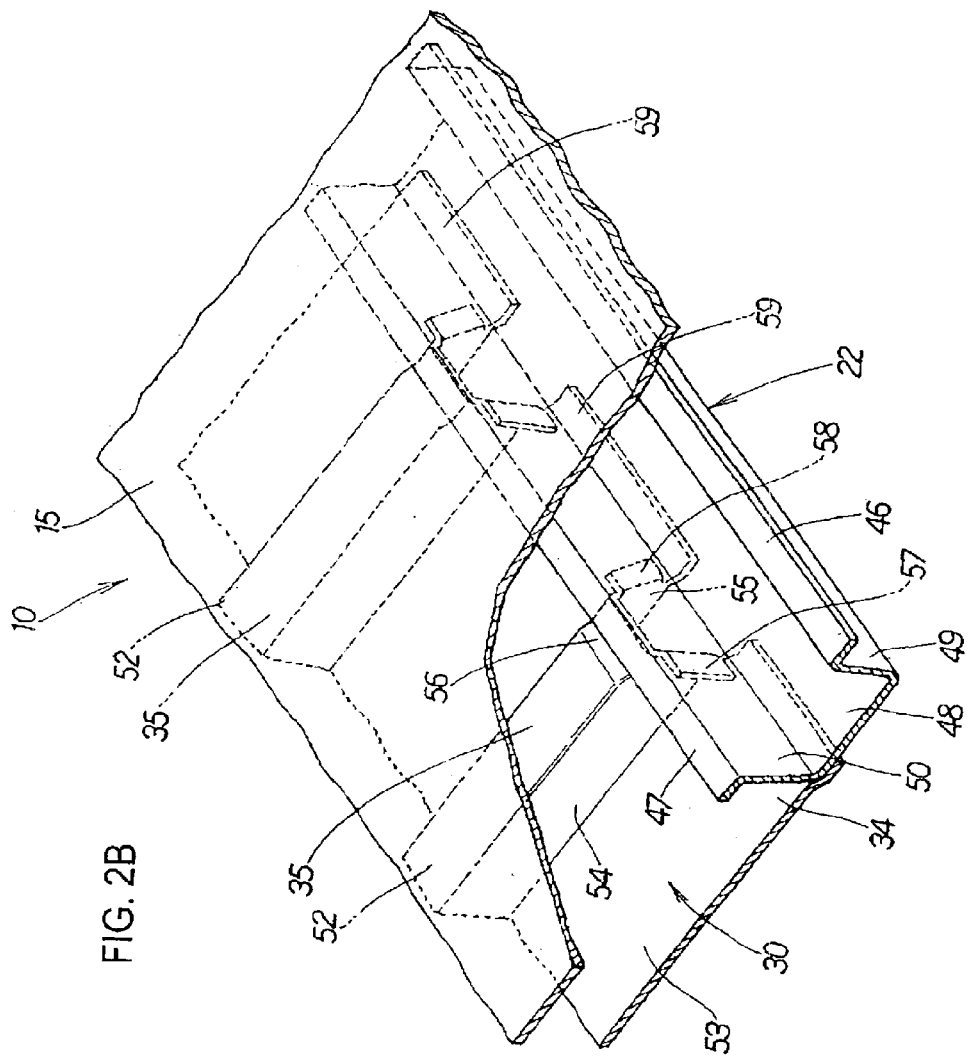

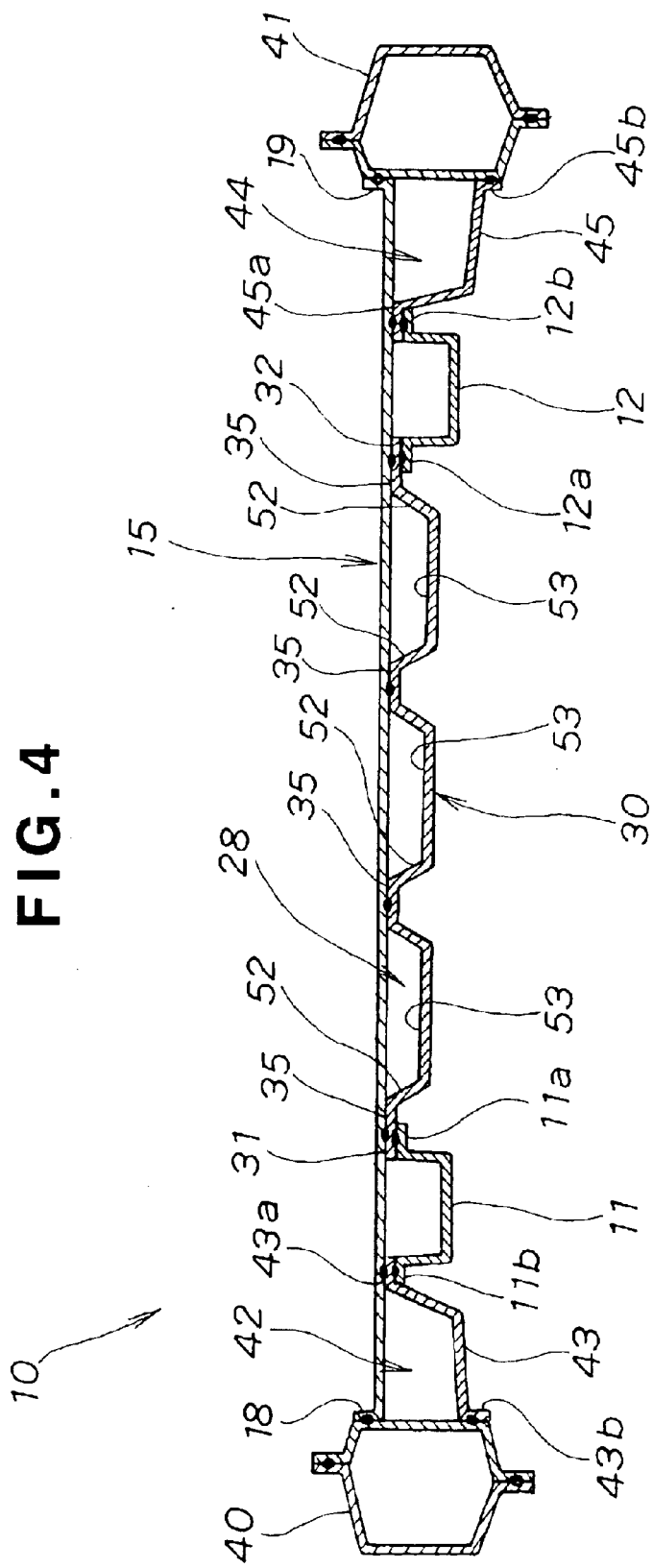

VEHICLE FLOOR STRUCTURE

FIELD OF THE INVENTION

The present invention relates to vehicle floor structures in which a plurality of crossmembers are extended between left and right floor frame members at certain intervals and a floor panel is provided over the floor frame members and the crossmembers.

BACKGROUND OF THE INVENTION

FIG. 19 hereof illustrates a conventional vehicle floor structure.

The vehicle floor structure includes longitudinally extending left and right floor frame members 200, 201, a plurality of crossmembers 202, 203, 204, 205, 206, 207, 208 and 209 extended between the left and right floor frame members 200, 201 at predetermined intervals, and a floor panel 210 placed over the left and right floor frame members 200, 201 and the crossmembers 202, 203, 204, 205, 206, 207, 208 and 209.

Side frame members 211 are connected to the front ends of the left and right floor frame members 200, 201.

In the vehicle floor structure, the left and right floor frame members 200, 201 are merely connected together by the crossmembers 202 to 209. If the right floor frame member 201, for example, is subjected to a large load f upon an offset collision of the vehicle, the load f is hardly transmitted to the left floor frame member 200.

Almost all the large load f exerted on the right floor frame member 201 is thus absorbed by the right floor frame member 201. To prevent deformation of the right floor frame member 201 due to the large load f, it is required to increase the strength of the right floor frame member 201.

An uneven load f, however, is not necessarily exerted only on the right floor frame member 201 and may also be exerted on the left floor frame member 200. It is thus necessary to design the left and right floor frame members 200, 201 to have enough strength to be able to withstand a large load, which results in increased weights of the floor frame members 200, 201.

For reinforcement of vehicle floor structures, an art of arranging a reinforcing member between left and right frame members is known (e.g., JP-A-2000-135990).

Such a vehicle floor structure will be described with reference to FIGS. 20A and 20B.

A vehicle floor structure 220 shown in FIGS. 20A and 20B consists of left and right underframe members 221, 222 arranged below a cab floor (not shown) and a reinforcing member 223 arranged between the underframe members 221, 222. The reinforcing member 223 is attached at its left and right side edge portions to the left and right underframe members 221, 222.

The reinforcing member 223 is a corrugated panel formed with a plurality of raised portions 224 provided in parallel to have an uneven cross-sectional shape as shown in FIG. 20B. The reinforcing member 223 provided between the left and right underframe members 221, 222 reinforces the left and right underframe members 221, 222 against a load evenly exerted on the left and right underframe members 221, 222, for example.

The vehicle floor structure 220 is configured with the reinforcing member 223 merely attached at its left and right side edge portions 225, 226 to the left and right underframe members 221, 222. If, upon an offset collision of the vehicle, a large load f is imposed on the right underframe member 222 as shown in FIG. 20A, for example, the load f is hardly transmitted to the left underframe member 221, as described above. Almost all the large load f imposed on the right underframe member 222 is received by the right underframe member 222. To prevent deformation of the right underframe member 222 due to a large load f, it is required to increase the strength of the right underframe member 222.

An uneven load is not necessarily exerted only on the right underframe member 222 and may also be exerted on the left underframe member 221. It is thus necessary to design the right and left underframe members 221, 222 to have enough strength to be able to withstand a large load f, which results in increased weights of the left and right underframe members 221, 222.

Thus, there is a demand for a vehicle floor structure which can avoid weight increase while maintaining the frame strength.

SUMMARY OF THE INVENTION

According to an aspect of the present invention, there is provided a vehicle floor structure which comprises: left and right floor frame members; a plurality of crossmembers extended between the left and right floor frame members at certain longitudinal intervals; a floor panel mounted to the left and right floor frame members and the crossmembers; and a corrugated sheet in a wave form having a plurality of longitudinally oriented ridges disposed in a substantially rectangular space formed by the left and right floor frame members and opposite ones of the crossmembers; wherein, left and right side portions of the corrugated sheet are connected to the left and right floor frame members, respectively, front and rear edge portions of the corrugated sheet are connected to the opposite crossmembers, and the ridges of the corrugated sheet are connected to the floor panel.

As described above, the floor structure of the present invention forms a space by the left and right floor frame members and the crossmembers. The corrugated sheet is disposed in the space in such a manner that its ridges are oriented longitudinally. The corrugated sheet is connected at the left and right side portions to the left and right floor frame members, and is connected at the front and rear edge portions to the opposite crossmembers, and is connected at the ridges to the floor panel. That is, the corrugated sheet occupies the space formed by the left and right floor frame members and the crossmembers and is arranged with the ridges oriented longitudinally. If a large load is imposed rearward on the right floor frame member, for example, upon an offset collision of the vehicle, the load is transmitted from the right floor frame member to the left floor frame member via the corrugated sheet. The large load imposed on the right floor frame member can thus be dispersed to be received by the left and right floor frame members, and the floor panel and the corrugated sheet located therebetween. If the right floor frame member is reduced in strength to some degree, the right floor frame member can still be prevented from deformation, accordingly.

An uneven load is not necessarily exerted on the right floor frame member and may also be exerted on the left floor frame member. In such a case, a large load can be dispersed into and received by the right floor frame member, the floor panel and the corrugated sheet located therebetween. If the left floor frame member is reduced in strength to some degree, the left floor frame member can still be prevented from deformation, accordingly.

The floor panel of the present invention is preferably mounted on the top of or to the bottom of the left and right floor frame members and the crossmembers. The vehicle floor structure is supported in the vicinities of axles of front and rear wheels and can be curved downward on supporting points in the vicinities of the axles of the front and rear wheels. At that time, the vehicle floor structure is compressed at its upper surface and is stretched at its lower surface. The corrugated sheet having a higher strength is disposed especially on the floor panel to dispose a member of higher strength on the compressed surface. As a result, the bending strength of the vehicle floor structure can be increased.

The ridges of the corrugated sheet are upward- or downward-protruded portions.

BRIEF DESCRIPTION OF THE DRAWINGS

Preferred embodiments of the present invention will be described in detail below, by way of example only, with reference to the accompanying drawings, in which:

FIG. 1 is a plan view of a vehicle floor structure according to a first embodiment of the present invention;

FIGS. 2A and 2B are perspective views of the vehicle floor structure according to the first embodiment of the present invention.

FIG. 4 is a cross-sectional view taken along line 4—4 in FIG. 1;

FIG. 5A is a cross-sectional view taken along line 5A—5A in FIG. 2, while

DETAILED DESCRIPTION OF THE PREFERRED EMBODIMENTS

Figure 3:
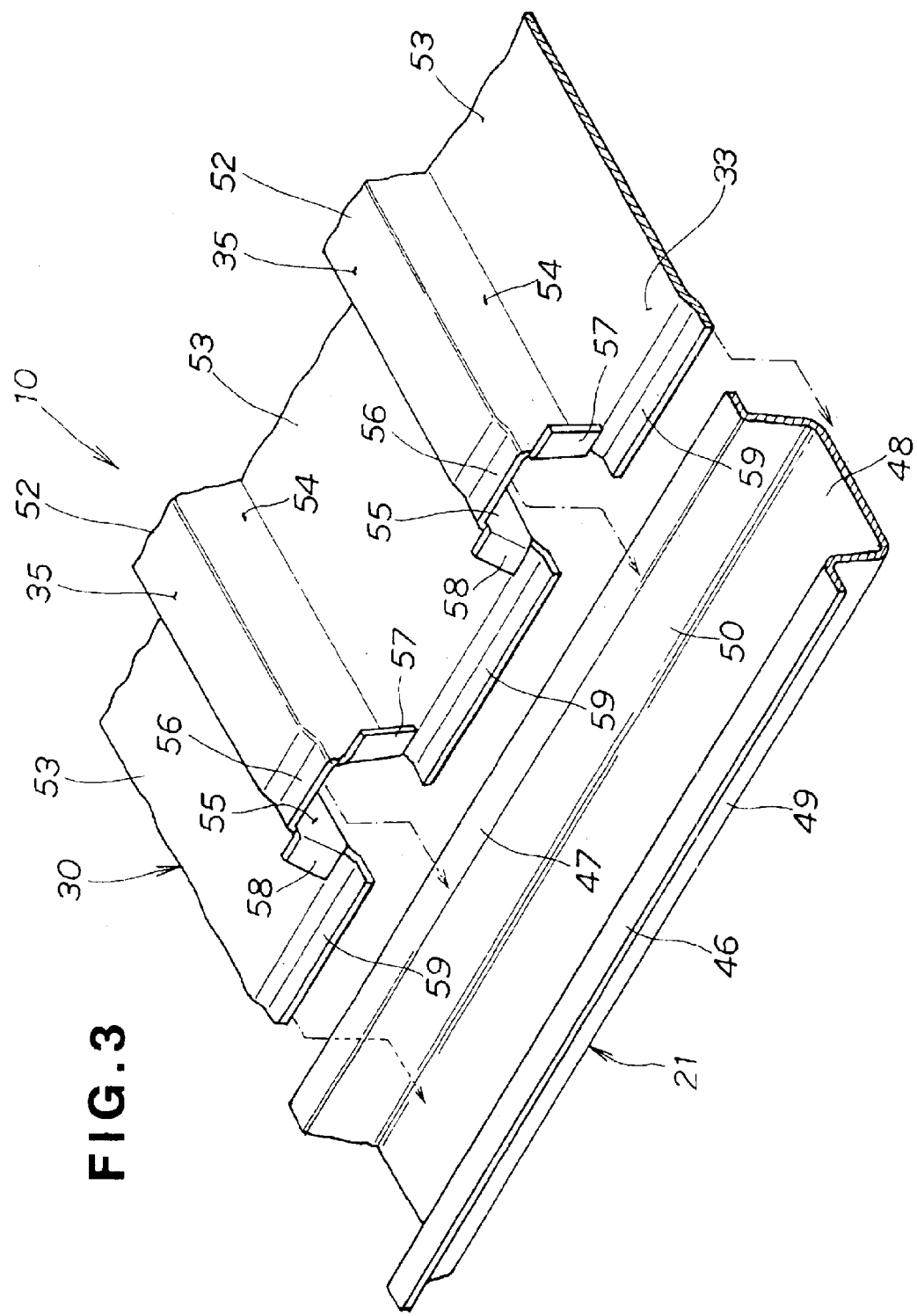
FIG. 3 is an exploded perspective view of FIG. 2 without a panel.

Discussion will be made first as to a vehicle floor structure according to a first embodiment of the present invention, referring to FIGS. 1 to 5A and 5B.

As shown in FIG. 1, a vehicle floor structure 10 includes left and right floor frame members 11, 12, side frame members 13, 13, a plurality of crossmembers 21, 22, 23, 24, 25, 26 and 27, a corrugated sheet 30, a floor panel 15, left and right side sills 40, 41, and left and right reinforcing plates 43, 45.

The left and right floor frame members 11, 12 extend longitudinally with a certain space therebetween.

The side frame members 13 are attached to the front ends of the left and right floor frame members 11, 12.

The crossmembers 21, 22, 23, 24, 25, 26 and 27 of the first to seventh crossmembers are extended between the left and right floor frame members 11, 12 at predetermined longitudinal intervals.

The corrugated sheet 30 is formed in a waved section shape. The corrugated sheet 30 is disposed in a substantially rectangular space 28 formed by the left and right floor frame members 11, 12, the first crossmember 21 and the second crossmember 22 in such a manner that its upper ridges (ridges) 35 are oriented longitudinally. The first crossmember 21 and second crossmember 22 constitute opposite crossmembers. Left and right side portions 31, 32 of the corrugated sheet 30 are connected to the left and right floor frame members 11, 12, respectively. Front and rear edge portions 33, 34 of the corrugated sheet 30 are connected to the first and second crossmembers 21, 22, respectively.

The floor panel 15 is placed over the left and right floor frame members 11, 12 and the first to seventh crossmembers 21, 22, 23, 24, 25, 26 and 27.

The ridges 35 of the corrugated sheet 30 are joined to the undersurface of the floor panel 15.

The left and right side sills 40, 41 are arranged outside of the left and right floor frame members 11, 12, respectively.

A left reinforcing plate 43 is disposed in a substantially rectangular space 42 formed by the left side sill 40, left floor frame member 11, first crossmember 21 and second crossmember 22.

A right reinforcing plate 45 is disposed in a substantially rectangular space 44 formed by the right side sill 41, right floor frame member 12, first crossmember 21 and second crossmember 22.

Front and rear end portions 16, 17 of the floor panel 15 are connected to the first crossmember 21 and the fifth crossmember 25, respectively. Left and right edge portions 18, 19 of the floor panel 15 are connected to the left and right side sills 40, 41, respectively.

As shown in FIGS. 2A and 2B, the first and second crossmembers 21 and 22 are formed in a substantially U-shaped section shape. FIG. 2A shows the front edge portion 33 of the corrugated sheet 30 connected to the first crossmember 21. The floor panel 15 is connected to front and rear flat flanges 46, 47 formed at upper portions of the first crossmember 21 and to the ridges 35 of the corrugated sheet 30.

The rear edge portion 34 of the corrugated sheet 30 is connected to the second crossmember 22 in the same manner as the front edge portion 33 of the corrugated sheet 30 is connected to the first crossmember 21. Therefore, the structure of connecting the rear edge portion 34 of the corrugated sheet 30 to the second crossmember 22 will not be described.

As shown in FIG. 3, the first crossmember 21 is formed in a substantially U-shaped section shape, including a bottom 48 extending transversely, a front wall 49 extending vertically upward from the front edge of the bottom 48, a rear wall 50 extending vertically upward from the rear edge of the bottom 48, and the front and rear flat flanges 46, 47 formed at the top of the front and rear walls 49, 50, respectively.

The corrugated panel sheet 30 is a member of increased strength formed with a plurality of raised strips 52 extending longitudinally at certain intervals, to be in a wave form with the raised strips 52 and a plurality of flat portions 53.

Each raised strip 52 includes an upper surface (hereinafter referred to as a ridge) 35 and left and right side walls 54, 55. A step 56 is formed in a front end portion of the ridge 35. A front end of the left side wall 54 is bent leftward to form a left flap 57. A front end of the right side wall 55 is bent rightward to form a right flap 58. Each flat portion 53 has a step 59 formed in its front end.

Figure 5A:
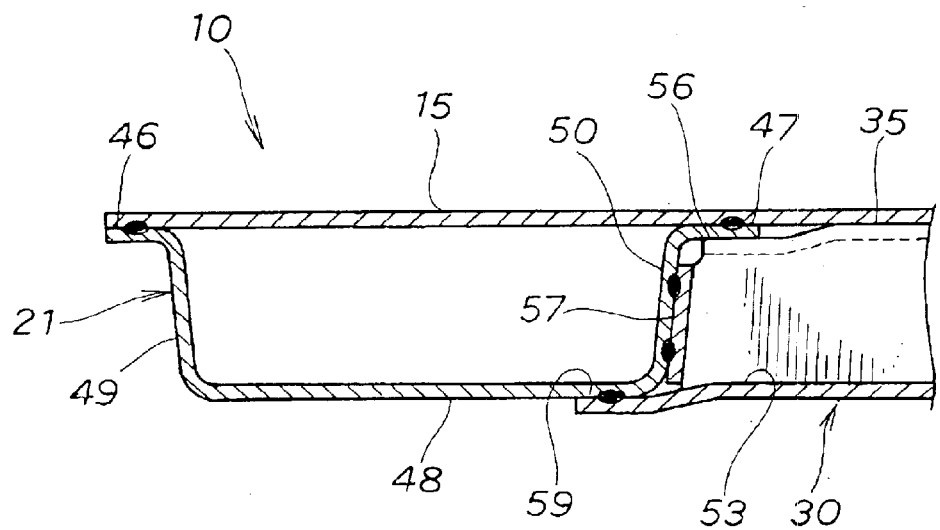

The front edge portion 33 of the corrugated sheet 30 is brought into contact with the rear wall 50 of the first crossmember 21 as shown by arrows, thereby to cause the left and right flaps 57, 58 at the raised strips 52 to abut on the rear wall 50, the steps 56 in the raised strips 52 to abut on the rear surface of the flat rear flange 47, and the steps 59 in the flat portions 53 to abut on the bottom 48 of the first crossmember 21 (see also FIG. 5A).

As shown in FIG. 4, the corrugated sheet 30 is disposed in the space 28 between the left and right floor frame members 11, 12. The ridges 35 of the corrugated sheet 30 are connected to the floor panel 15 by spot welding, for example.

When the ridges 35 at the left and right side portions 31, 32 of the corrugated sheet 30 are connected to the floor panel 15, the ridges 35 at the left and right side portions 31, 32 are connected to inside upper edges 11a, 12a of the left and right floor frame members 11, 12, respectively.

The left reinforcing plate 43 is disposed in the space 42 formed by the left floor frame member 11 and the left side sill 40. An inside upper edge 43a of the left reinforcing plate 43 is connected to the floor panel 15 by spot welding, for example. An outside lower edge 43b of the left reinforcing plate 43 is connected to the left side sill 40 by spot welding, for example.

When the inside upper edge 43a of the left reinforcing plate 43 is connected to the floor panel 15, an outside upper edge 11b of the left floor frame member 11 is connected to the inside upper edge 43a of the left reinforcing plate 43. The left reinforcing plate 43 is bent in a dogleg for increased strength.

The right reinforcing plate 45 is disposed in the space 44 formed by the right floor frame member 12 and the right side sill 41. An inside upper edge 45a of the right reinforcing plate 45 is connected to the floor panel 15 by spot welding, for example. An outside lower edge 45b of the right reinforcing plate 45 is connected to the right side sill 41 by spot welding, for example.

When the inside upper edge 45a of the right reinforcing plate 45 is connected to the floor panel 15, an outside upper edge 12b of the right floor frame member 12 is connected to the inside upper edge 45a of the right reinforcing plate 45. The right reinforcing plate 45 is bent in a dogleg for increased strength.

The left edge portion 18 of the floor panel 15 is connected to the left side sill 40 by spot welding, for example. The right edge portion 19 of the floor panel 15 is connected to the right side sill 41 by spot welding, for example.

In the corrugated sheet 30, the number of the raised strips 52 is four and the number of the flat portions 53 is three. The raised strips 52 and the flat portions 53 are not limited to those numbers and the numbers thereof may be determined as desired to desirably change the strength of the corrugated sheet 30.

As shown in FIG. 5A, the front and rear flat flanges 46, 47 of the first crossmember 21 are connected to the floor panel 15 by spot welding, for example. The left flap 57 of the corrugated sheet 30 is connected to the rear wall 50 of the first crossmember 21 by spot welding, for example. The step 59 in the corrugated sheet 30 is connected to the bottom 48 of the first crossmember 21 by spot welding, for example.

Figure 5B:
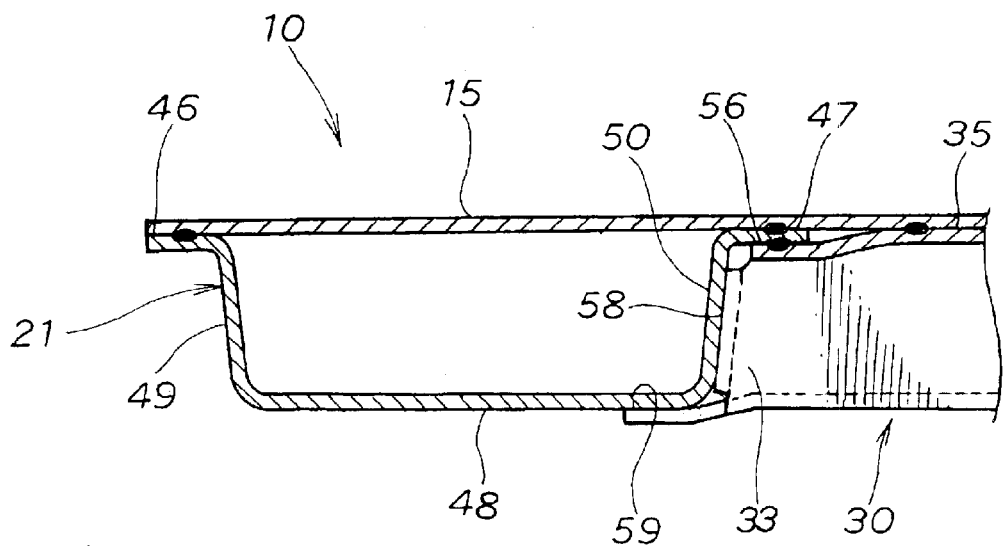
FIG. 5B is a cross-sectional view taken along line 5B—5B in FIG. 2.

As shown in FIG. 5B, the rear flange 47 of the first crossmember 21 is connected to the step 56 in the corrugated sheet 30 by spot welding, for example. The ridge 35 is connected to the floor panel 15 by spot welding, for example. The right flap 58 of the corrugated sheet 30 is connected to the rear wall 50 of the first crossmember 21 by spot welding, for example. In this manner, the front edge portion 33 of the corrugated sheet 30 is connected to the first crossmember 21.

As shown in FIG. 1, the corrugated sheet 30 is disposed in the space 28 formed by the left and right floor frame members 11, 12 and the first and second crossmembers 21, 22 with the ridges 35 longitudinally oriented. The corrugated sheet 30 is connected at the left and right side portions 31, 32 to the left and right floor frame members 11, 12, and is connected at the front and rear edge portions 33, 34 to the first and second crossmembers 21, 22, and is connected at the ridges 35 to the floor panel 15. The space formed by the left and right floor frame members 11, 12 and the first and second crossmembers 21, 22 is thus occupied by the corrugated sheet 30. The longitudinal arrangement of the ridges 35 of the corrugated sheet 30 allows transmission of a large load F imposed rearward on the right floor frame member 12, for example, upon an offset collision of the vehicle from the right floor frame member 12 to the left floor frame member 11 via the corrugated sheet 30.

The large load F imposed on the right floor frame member 12 can thus be dispersed to be received by the left and right floor frame members 11, 12, and the floor panel 15 and the corrugated sheet 30 located therebetween. If the right floor frame member 12 is reduced in strength to some degree, the right floor frame member 12 can still be prevented from deformation, accordingly.

Such an uneven load is not necessarily exerted only on the right floor frame member 12 and may also be exerted on the left floor frame member 11. In such a case, a large load F can be dispersed into and received by the left and right floor frame members 11, 12, and the floor panel 15 and the corrugated sheet 30 located therebetween. If the left floor frame member 11 is reduced in strength to some degree, the left floor frame member 11 can be prevented from deformation, accordingly.

Reduction in strength of the left and right floor frame members 11, 12 leads to prevention of weight increase while maintaining the strength of the left and right floor frame members 11, 12.

Now, first to fourth modifications of the first embodiment will be described with reference to FIGS. 6 to 9.

Figure 6:
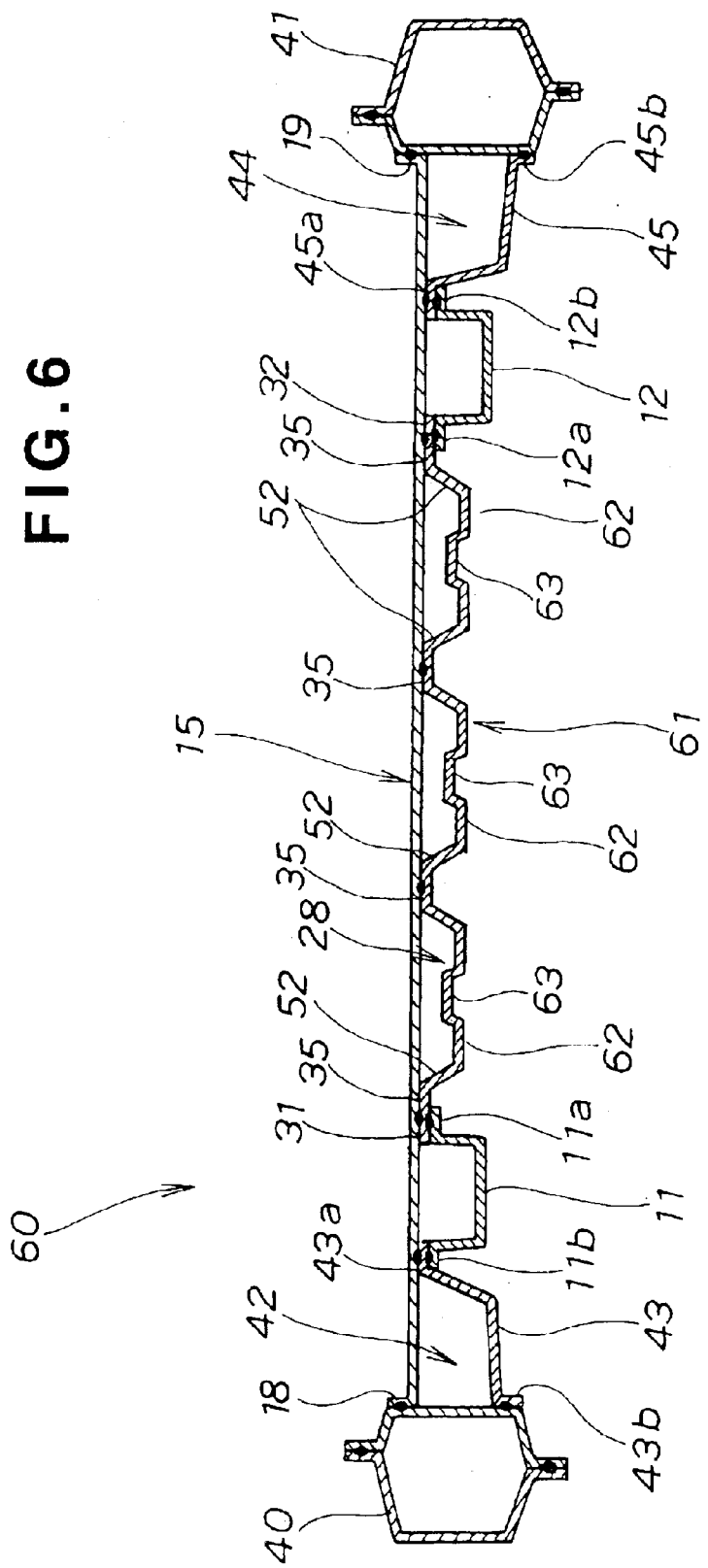
FIG. 6, which corresponds to FIG. 4, is a cross-sectional view illustrating a modified corrugated sheet according to a first modification of the first embodiment.

A vehicle floor structure 60 in a first modification shown in FIG. 6 differs from the vehicle floor structure 10 in the first embodiment only in that recesses 63 are formed in flat portions 62 of a corrugated sheet 61. The other structural elements are identical to those of the vehicle floor structure 10 in the first embodiment.

The vehicle floor structure 60 in the first modification has the recesses 63 formed in the flat portions 62 of the corrugated sheet 61 to further facilitate adjustment in strength of the corrugated sheet 61 suitably for the sizes of vehicles.

Figure 7:
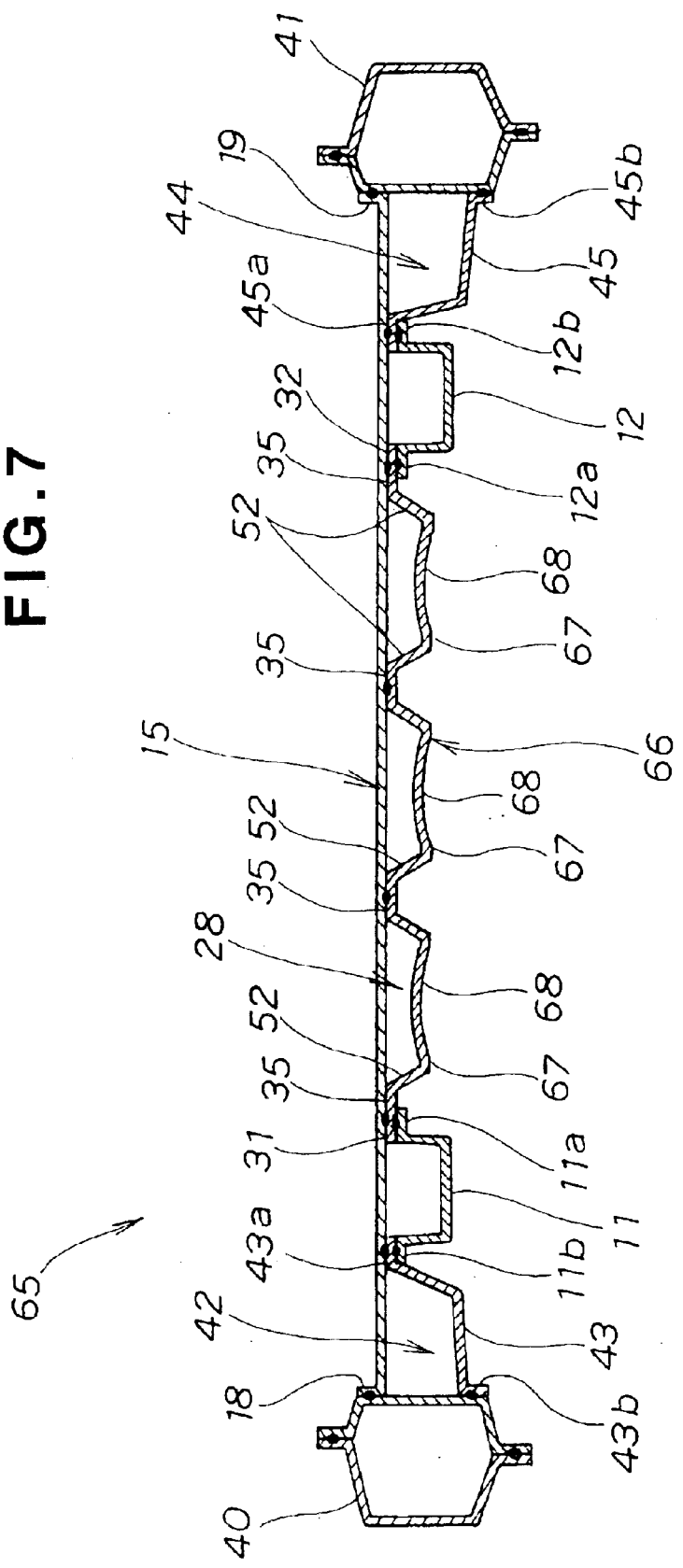
FIG. 7, which corresponds to FIG. 4, is a cross-sectional view illustrating a modified corrugated sheet according to a second modification of the first embodiment.

A vehicle floor structure 65 in a second modification shown in FIG. 7 differs from the vehicle floor structure 10 in the first embodiment only in that curved depressions 68 are formed in flat portions 67 of a corrugated sheet 66. The other structural elements are identical to those of the vehicle floor structure 10 in the first embodiment.

The vehicle floor structure 65 in the second modification has the curved depressions 68 formed in the flat portions 67 of the corrugated sheet 66 to further facilitate adjustment in strength of the corrugated sheet 66 suitably for the sizes of vehicles.

Figure 8:
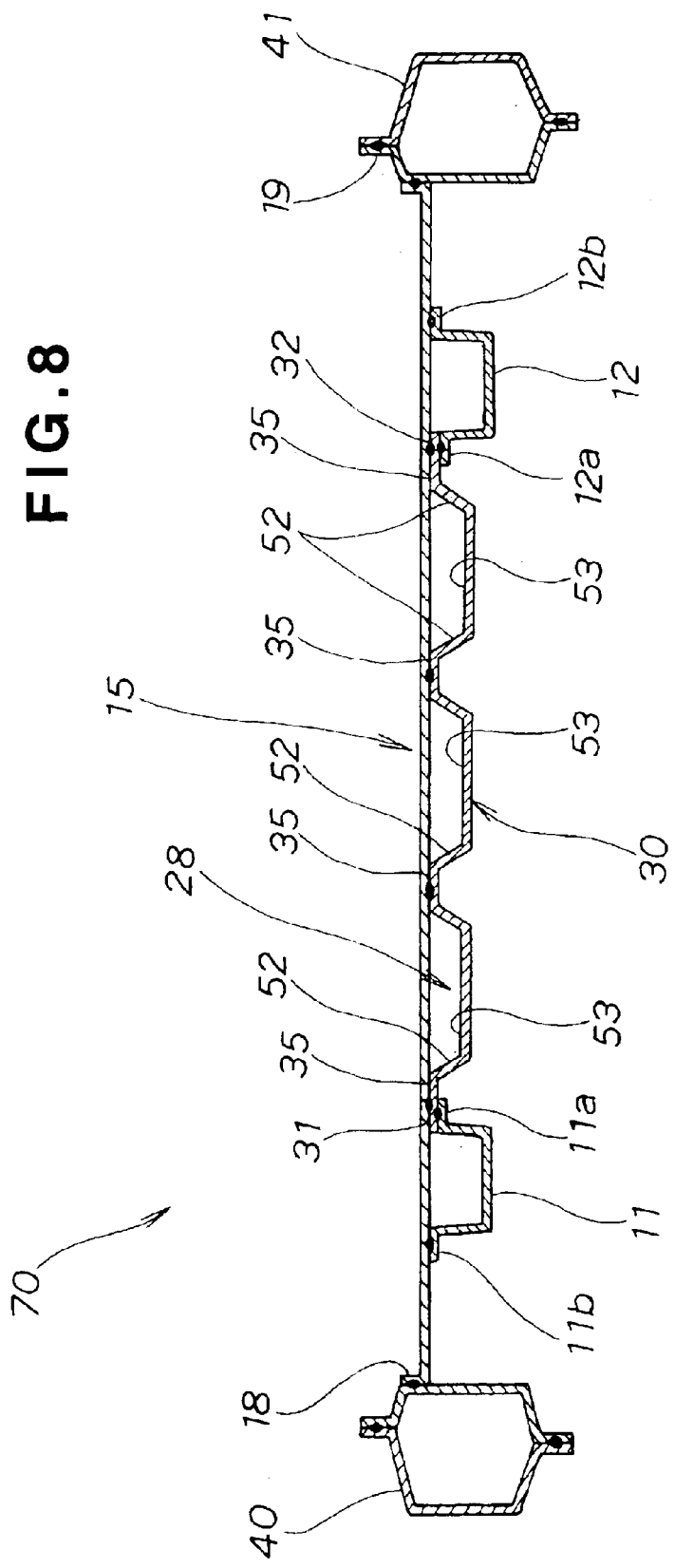
FIG. 8, which corresponds to FIG. 4, is a cross-sectional view of an example in which left and right reinforcing plates are eliminated, according to a third modification of the first embodiment.

A vehicle floor structure 70 in a third modification shown in FIG. 8 differs from the vehicle floor structure 10 in the first embodiment only in that the left and right reinforcing plates 43, 45 are eliminated from the vehicle floor structure 10 shown in the first embodiment and the outside upper edge 11b of the left floor frame member 11 is connected to the floor panel 15 and the outside upper edge 12b of the right floor frame member 12 is connected to the floor panel 15. The number of components is thus reduced, resulting in a simplified structure. The other components are identical to those of the vehicle floor structure 10 in the first embodiment.

Figure 9:
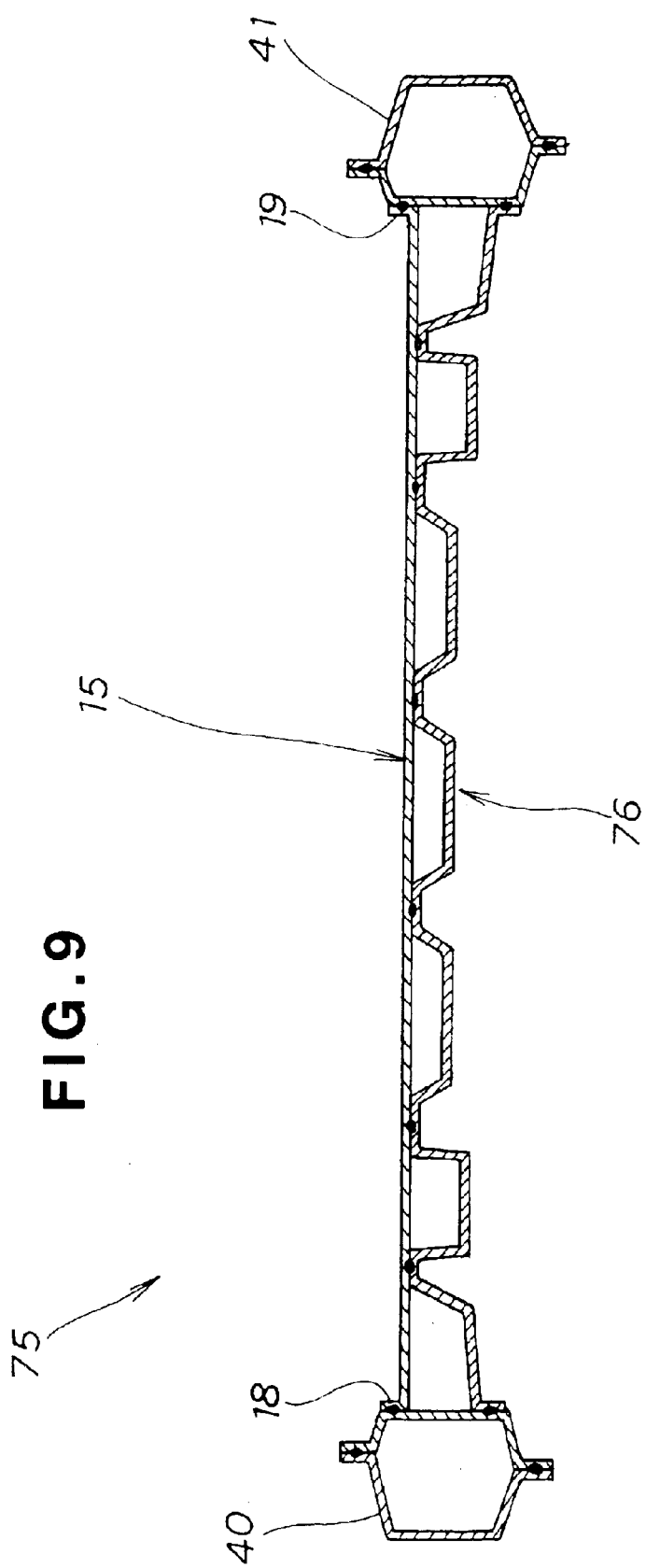
FIG. 9, which corresponds to FIG. 4, is a cross-sectional view of an example in which a corrugated sheet, left and right floor frame members and right and left reinforcing plates are integrally molded, according to a fourth modification of the first embodiment.

A vehicle floor structure 75 in a fourth modification shown in FIG. 9 differs from the vehicle floor structure 10 in the first embodiment only in that the left and right floor frame members 11, 12, the corrugated sheet 30 and the left and right reinforcing members 43, 45 of the vehicle floor structure 10 (see FIG. 4) are integrally formed into an underfloor member 76. The other structural elements are identical to those of the vehicle floor structure 10 in the first embodiment.

The vehicle floor structure 75 in the fourth modification has a reduced number of components and a simplified structure, simplifying assembly process.

Now, a vehicle floor structure according to a second embodiment of the present invention will be described with reference to FIGS. 10, 11, 12A and 12B. Components in the second embodiment identical to those in the first embodiment are given the identical numbers and will not be described.

Figure 10:
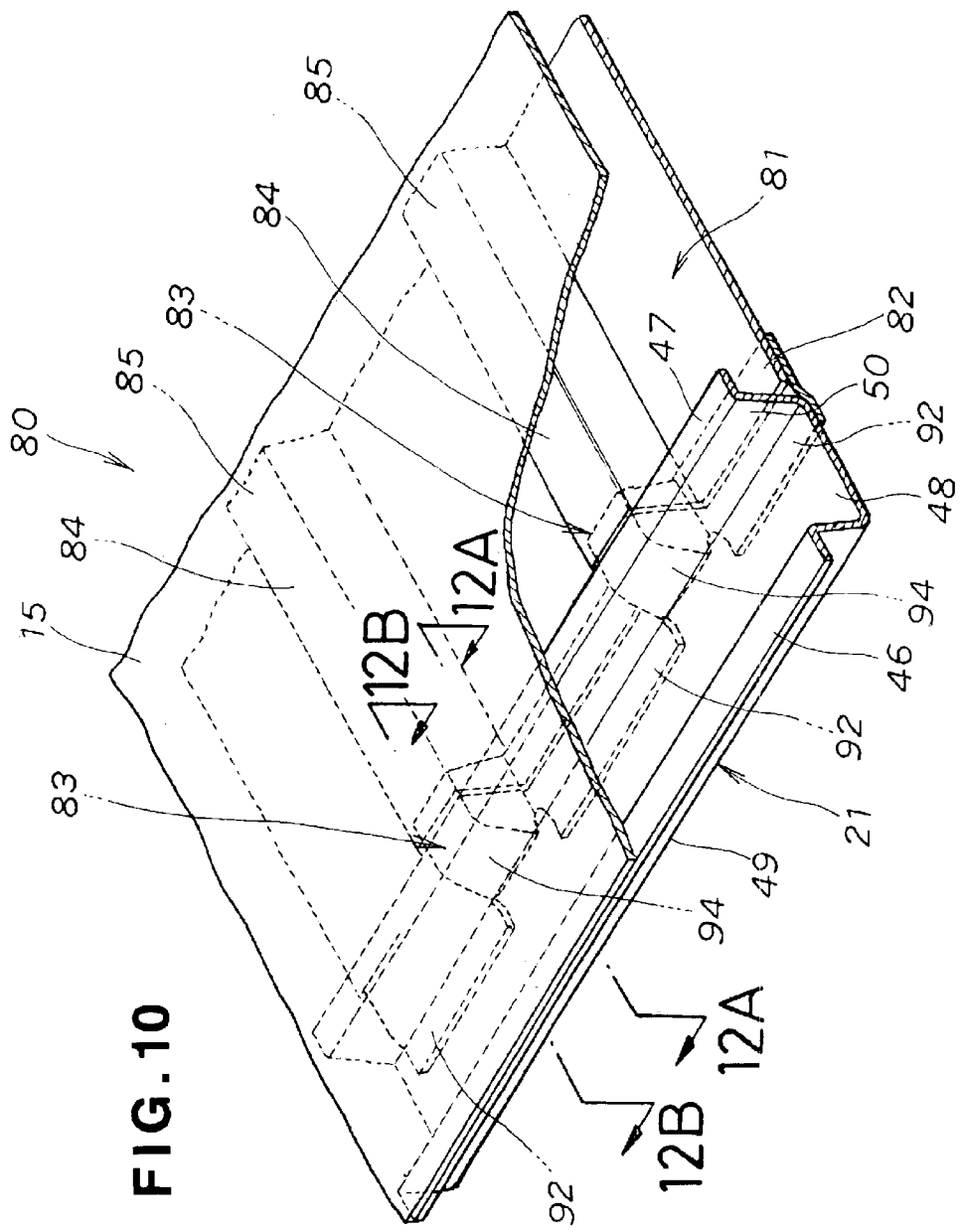
FIG. 10 is a perspective view of a vehicle floor structure according to a second embodiment of the present invention.

Referring to FIG. 10, a vehicle floor structure 80 in the second embodiment includes a first crossmember 21 formed in a U-shaped section shape, a corrugated sheet 81 connected at its front edge portion 82 to the first crossmember 21 via a mounting bracket 83, and a floor panel 15 connected to front and rear flat flanges 46, 47 formed at upper portions of the first crossmember 21 and a plurality of ridges 84 of the corrugated sheet 81.

A rear edge portion of the corrugated sheet 81 is connected to a second crossmember 22 (see FIG. 1) in the same manner as the front edge portion 82 of the corrugated sheet 81 is connected to the first crossmember 21, so that only the connection between the corrugated sheet 81 and the first crossmember 21 will be described.

Figure 11:
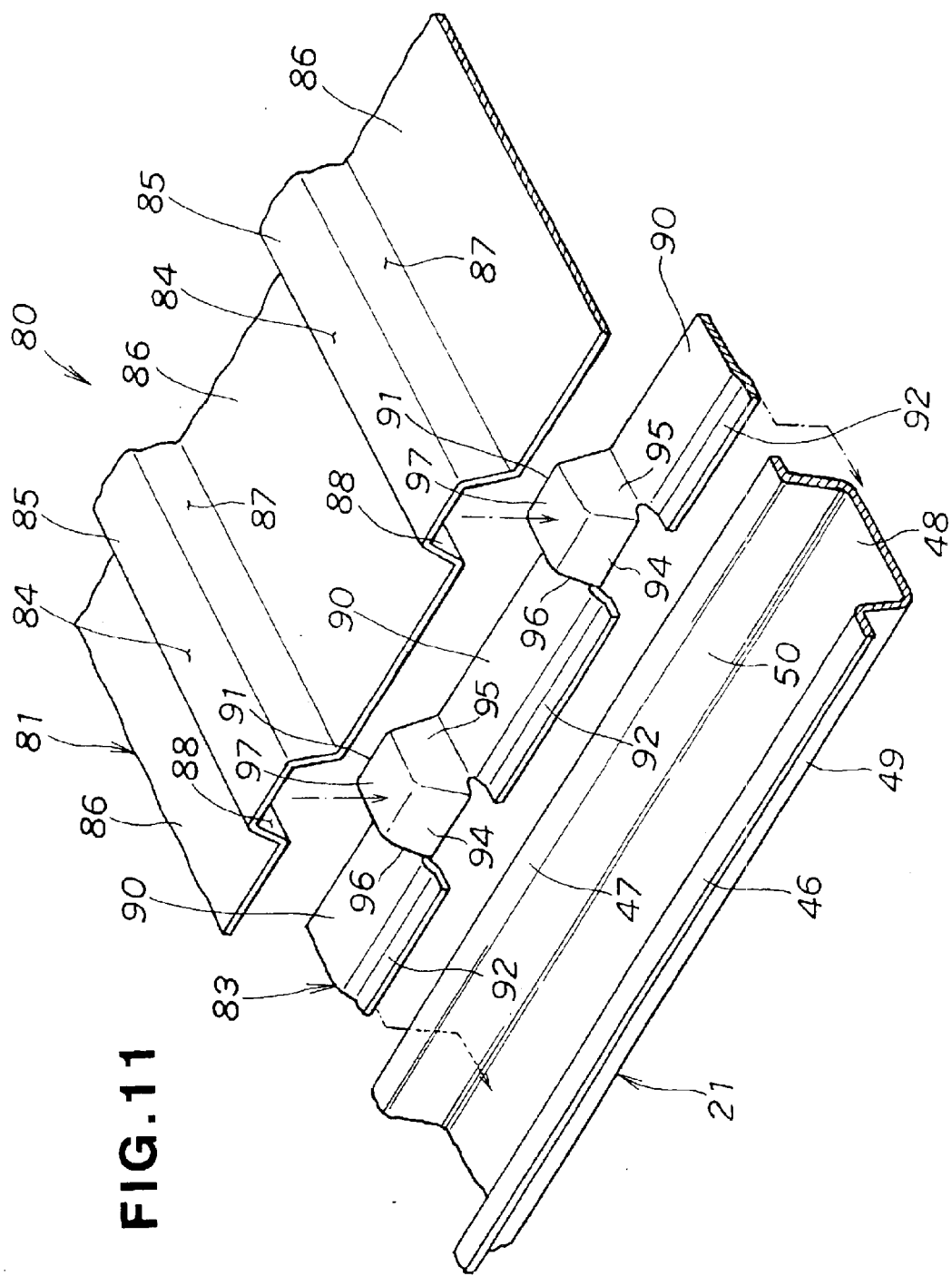
FIG. 11 is an exploded perspective view of FIG. 10 without a panel.

As shown in FIG. 11, the corrugated sheet 81 has a plurality of longitudinally extending raised strips 85 formed at certain intervals, to be in a wave form with the raised strips 85 and flat portions 86 for increased strength.

Each raised strip 85 includes an upper surface (hereinafter referred to as a ridge) 84 and left and right side walls 87, 88.

The mounting bracket 83 is a strip member extended between right and left floor frame members 11, 12 (see FIG. 1). The mounting bracket 83 includes flat surfaces 90 corresponding to the flat portions 86 of the corrugated sheet 81, protrusions 91 formed in the positions corresponding to the positions of the ridges 84 of the corrugated sheet 81, and steps 92 extending forward from the flat surfaces 90.

Each protrusion 91 includes a front wall 94 to abut against a rear wall 50 of the first crossmember 21, left and right walls 95, 96 to abut against the left and right side walls 87, 88 of the corrugated sheet 81, and an upper surface 97 to abut against the ridge 84 of the corrugated sheet 81.

The steps 92 are to abut against a bottom 48 of the first crossmember 21 (see FIG. 10).

Front end portions of the raised strips 85 of the corrugated sheet 81 are put over the protrusions 91 of the mounting bracket 83. Specifically, the ridges 84 and the left and right side walls 87, 88 of the corrugated sheet 81 are brought into contact with the upper surfaces 97 and the left and right walls 95, 96 of the protrusions 91, and also the flat portions 86 of the corrugated sheet 81 are brought into contact with the flat surfaces 90, thereby to fit the mounting bracket 83 to the front edge portion 82 of the corrugated sheet 81.

The front walls 94 of the protrusions 91 are made to abut on the rear wall 50 of the first crossmember 21 and the steps 92 are made to abut on the bottom 48 of the first crossmember 21 to fit the mounting bracket 83 to the first crossmember 21.

Figure 12A:
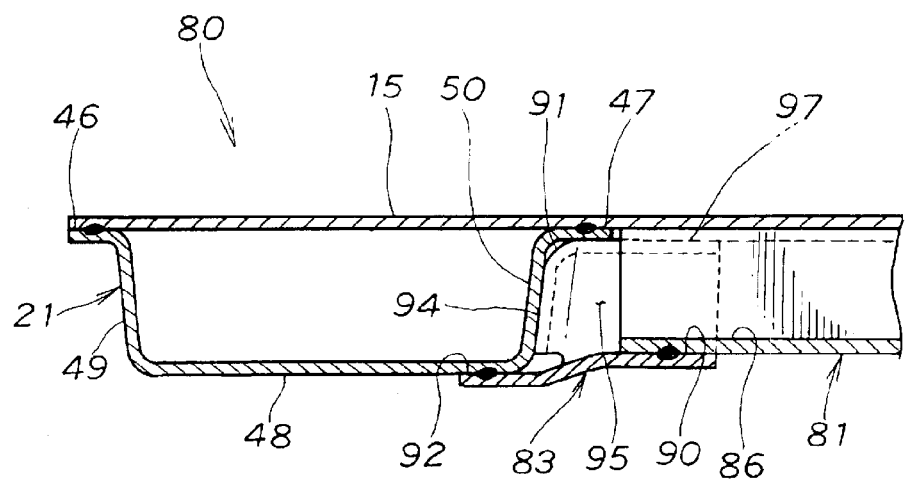
FIG. 12A is a cross-sectional view taken along line 12A—12A in FIG. 10.

As shown in FIG. 12A, the floor panel 15 is connected to the front and rear flanges 46, 47 of the first crossmember 21 by spot welding, for example. The flat portion 86 of the corrugated sheet 81 is connected to the flat surface 90 of the mounting bracket 83 by spot welding, for example. The step 92 of the mounting bracket 83 is connected to the bottom 48 of the first crossmember 21 by spot welding, for example.

Figure 12B:
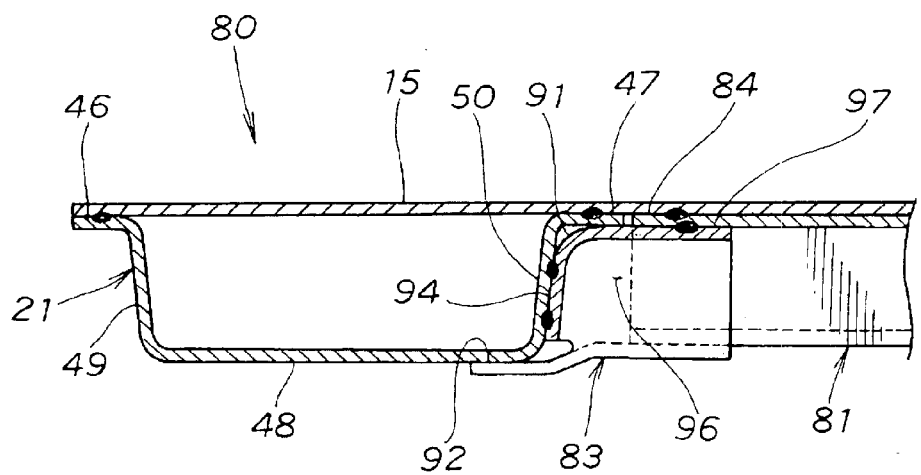
FIG. 12B is a cross-sectional view taken along line 12B—12B in FIG. 10.

Also, as shown in FIG. 12B, the front wall 94 of the mounting bracket 83 is connected to the rear wall 50 of the first crossmember 21 by spot welding, for example. The ridge 84 is connected the floor panel 15 by spot welding, for example. The upper surface 97 of the mounting bracket 83 is connected to the ridge 84 by spot welding, for example.

In this manner, the front edge portion 82 of the corrugated sheet 81 is connected to the first crossmember 21 via the mounting bracket 83.

The vehicle floor structure 80 in the second embodiment has the mounting bracket 83 to simplify the shapes of the front edge portion 82 and the rear edge portion of the corrugated sheet 81 as shown in FIG. 11, facilitating the production of the corrugated sheet 81, and resulting in cost reduction.

Now, a vehicle floor structure 100 according to a third embodiment of the present invention will be described with reference to FIGS. 13, 14, 15A and 15B. Components identical to those in the first embodiment are given the identical symbols and will not be described.

Figure 13:
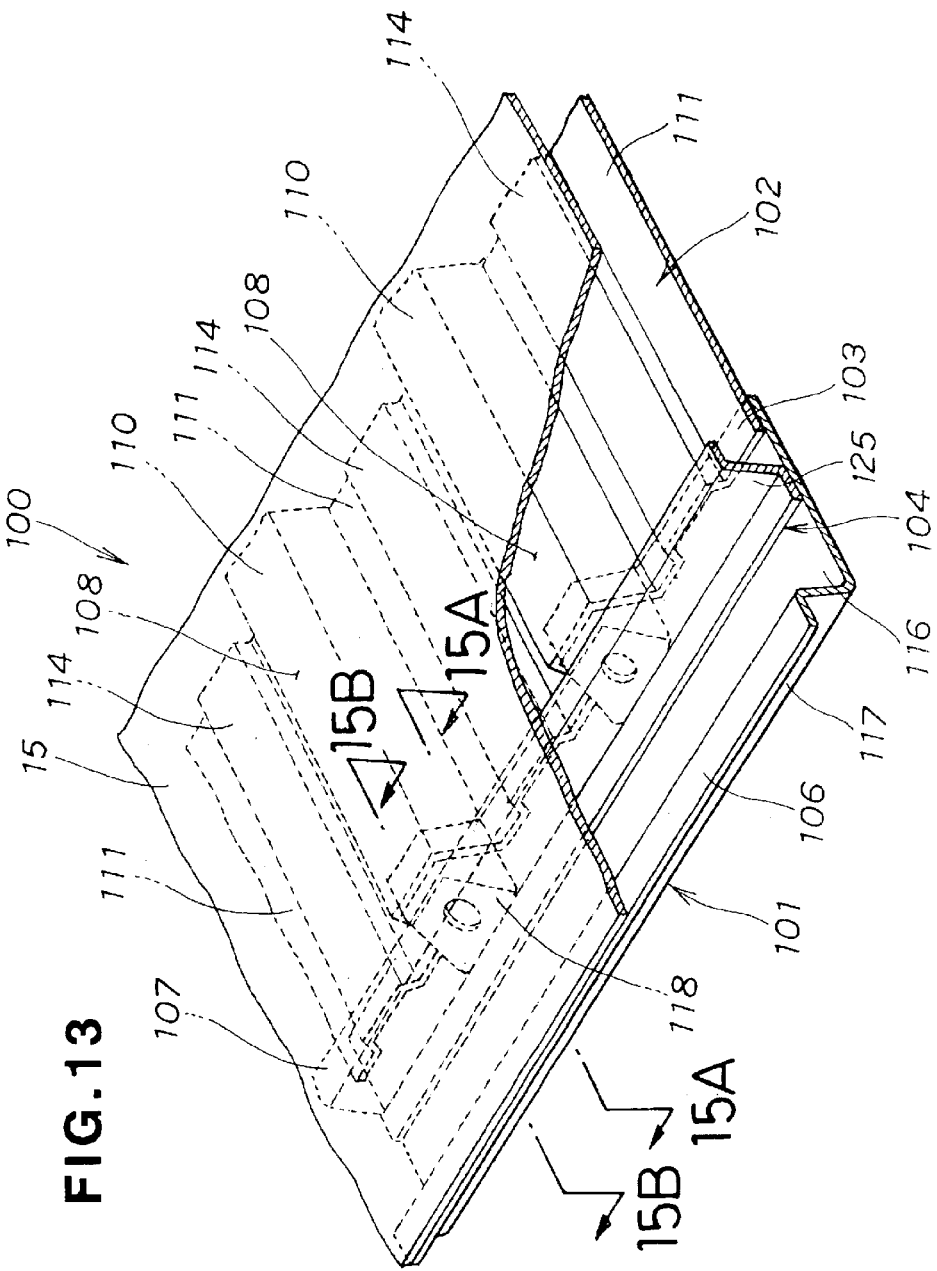
FIG. 13 is a perspective view of a vehicle floor structure according to a third embodiment of the present invention.

Referring to FIG. 13, a vehicle floor structure 100 in the third embodiment includes a first crossmember 101 formed in a substantially L-shaped section shape, a corrugated sheet 102, a mounting bracket 104 interposed therebetween for connecting the first crossmember 101 and a front edge portion 103 of the corrugated sheet 102, and a floor panel 15 connected to a flat flange 106 formed at a front-upper edge of the first crossmember 101, a flange-like upper edge 107 of the mounting bracket 104, and ridges 108 of the corrugated sheet 102.

A rear edge portion of the corrugated sheet 102 is connected to a second crossmember (see FIG. 1) in the same manner as the front edge portion 103 of the corrugated sheet 102 is connected to the first crossmember 101, so that only the structure of connecting the front edge portion 103 of the corrugated sheet 102 to the first crossmember 101 will be described.

Figure 14:
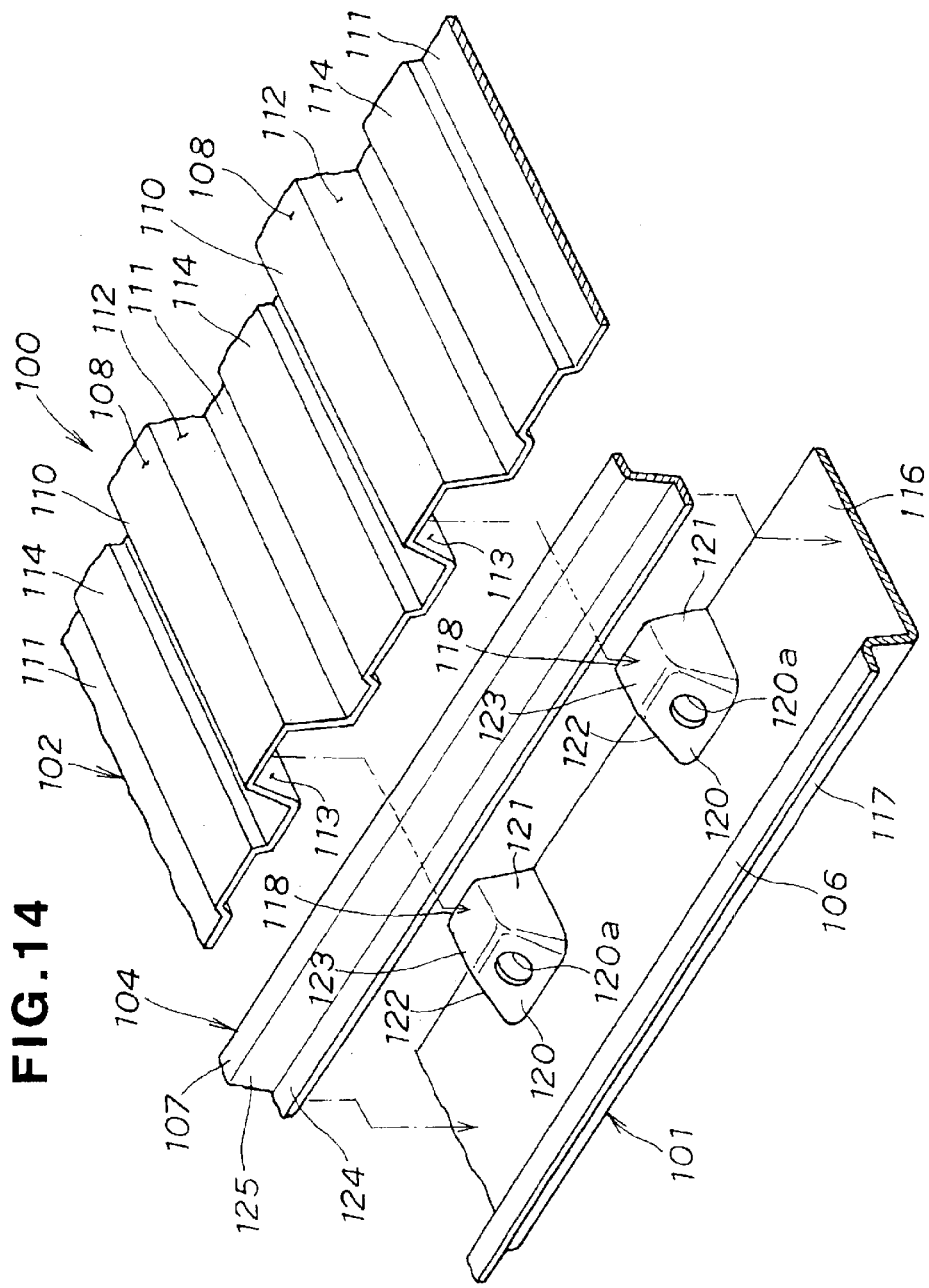
FIG. 14 is an exploded perspective view of FIG. 13 without a panel.

As shown in FIG. 14, the corrugated sheet 102 has a plurality of longitudinally extending raised strips 110 formed at certain intervals, to be in a wave form with the raised strips 110 and flat portions 111 for increased strength.

Each raised strip 110 includes an upper surface (hereinafter referred to as a ridge) 108 and left and right side walls 112, 113.

The flat portion 111 is formed in its center with a raised strip 114 lower in height than the raised strip 110 in a parallel relationship with the raised strip 110.

The first crossmember 101 is formed in a substantially L-shaped section shape, including a bottom surface 116 extending transversely, a front wall 117 raised at the front edge of the bottom surface 116, the flat front flange 106 formed at the upper edge of the front wall 117, and protrusions 118 formed in the positions corresponding to the positions of the raised strips 110 of the corrugated sheet 102.

Each protrusion 118 has a front wall 120 raised opposite to the front wall 117, left and right walls 121, 122 to abut against the left and right side walls 112, 113 of the corrugated sheet 102, and an upper surface 123 to abut against the ridge 108 of the corrugated sheet 102.

In substantially the center of each front wall 120, an opening 120a is formed. The formation of the openings 120a in the front walls 120 leads to a reduced weight of the first crossmember 101. The upper edge 107 of the mounting bracket 104 and the floor panel 15 are easily connected together by spot welding, for example.

The mounting bracket 104 is a substantially crank section member extended between the right and left floor frame members 11, 12 (see FIG. 1). The mounting member 104 includes a lower edge 124 to abut against the bottom surface 101 of the first crossmember 116, a well 125 raised upward from the rear edge of the lower edge 124, and the upper edge 107 extending rearward from the wall 125.

The first crossmember 101, corrugated sheet 102 and mounting bracket 104 are formed as described above to make the lower edge 124 of the mounting bracket 104 abut on the bottom surface 116 of the first crossmember 101.

The ridges 108 and the left and right side walls 112, 113 of the corrugated sheet 102 are brought into contact with the upper surfaces 123 and the left and right walls 121, 122 of the protrusions 118. The undersurfaces of the flat portions 111 of the corrugated sheet 102 are brought into contact with the bottom surface 116 of the first crossmember 101.

As shown in FIG. 13, the floor panel 15 abuts on the flat front flange 106 of the first crossmember 101, the upper edge 107 of the mounting bracket 104, and the ridges 108 of the corrugated sheet 102.

Figure 15A:
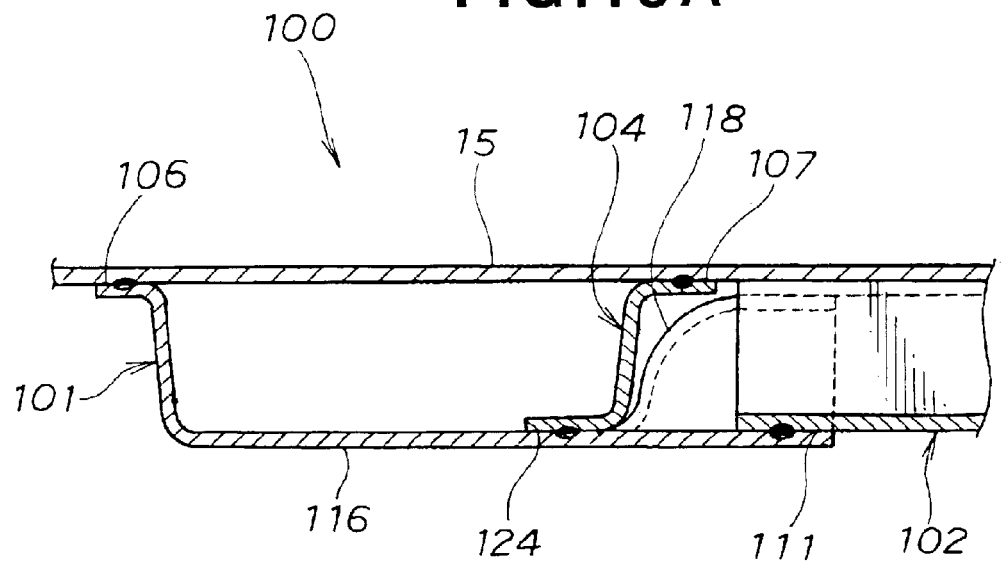
FIG. 15A is a cross-sectional view taken along line 15A—15A in FIG. 13.

As shown in FIG. 15A, the lower edge 124 of the mounting bracket 104 and the flat portion 111 of the corrugated sheet 102 are connected to the bottom surface 116 of the first crossmember 101 by spot welding, for example. The floor panel 15 is connected to the front flange 106 of the first crossmember 101 and the upper edge 107 of the mounting bracket 104 by spot welding, for example.

Figure 15B:
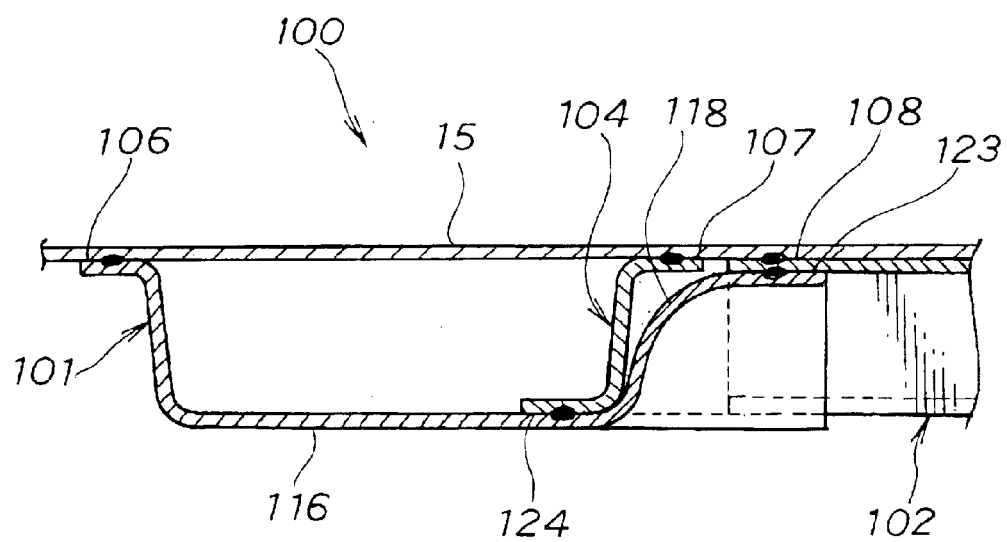
FIG. 15B is a cross-sectional view taken along line 15B—15B in FIG. 13.

As shown in FIG. 15B, the upper surfaces 123 of the protrusions 118 formed at the first crossmember 101 are connected to the inside of the ridges 108 of the corrugated sheet 102 by spot welding, for example. The upper surfaces of the ridges 108 are connected to the floor panel 15 by spot welding, for example.

As shown in FIG. 13, the front edge portion 103 of the corrugated sheet 102 is connected to the first crossmember 101 via the mounting bracket 104.

The vehicle floor structure 100 in the third embodiment has the mounting bracket 104 to simplify the form of the front edge portion 103 and the rear edge portion of the corrugated sheet 102, facilitating the production of the corrugated sheet 102, and resulting in cost reduction.

As shown in FIG. 14, the raised strips 114 are formed in the flat portions 111 of the corrugated sheet 102 to increase the strength of the corrugated sheet 102.

Now, a vehicle floor structure 130 according to a fourth embodiment of the present invention will be described with reference to FIG. 16. Components identical to those in the first embodiment are given the identical symbols and will not be described.

Figure 16:
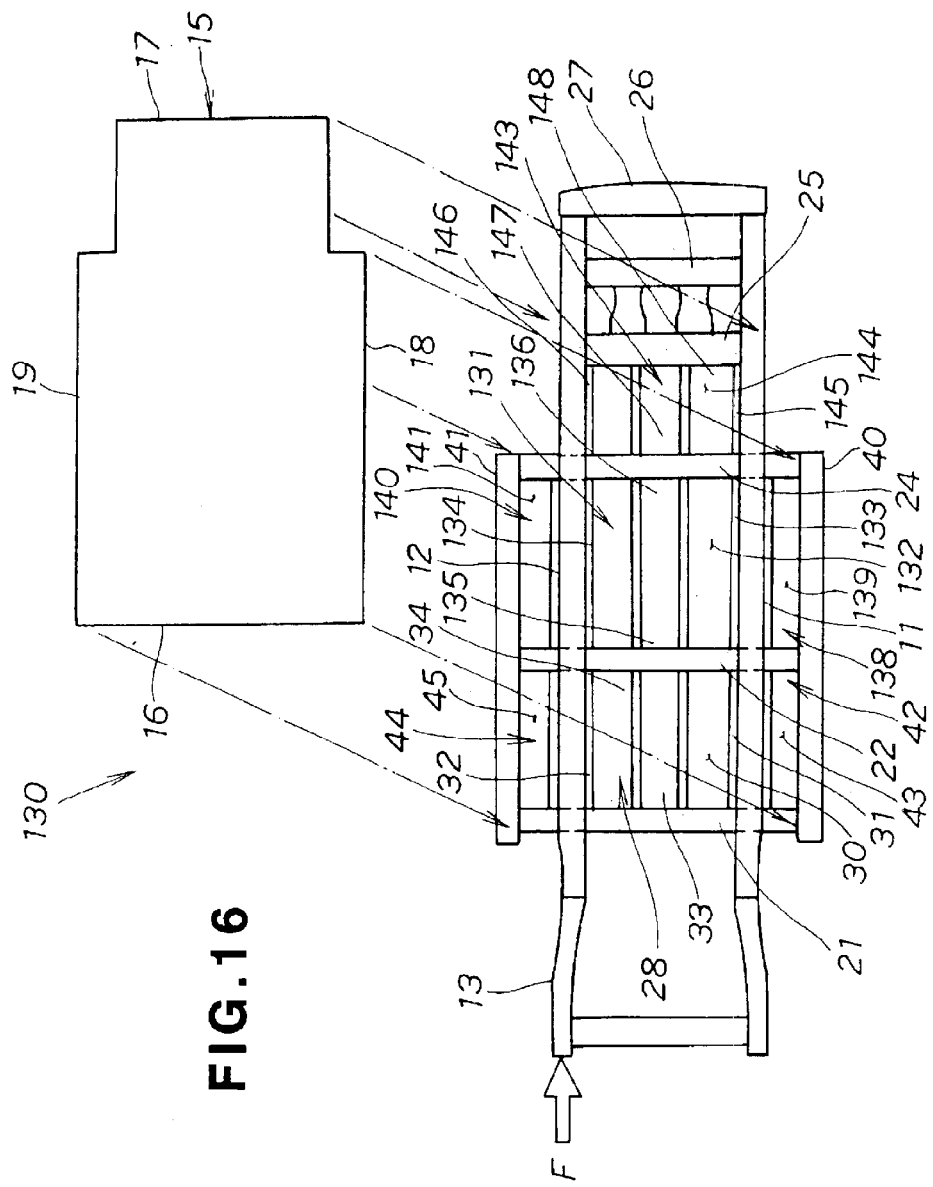
FIG. 16 is a plan view of a vehicle floor structure according to a fourth embodiment of the present invention.

Referring to FIG. 16, the vehicle floor structure 130 in the fourth embodiment includes, like the vehicle floor structure 10 in the first embodiment, a first corrugated sheet 30 with ridges oriented longitudinally, disposed in a substantially rectangular space 28 formed by left and right floor frame members 11, 12 and first and second crossmembers 21, 22.

Left and right side portions 31, 32 of the corrugated sheet 30 are connected to the left and right floor frame members 11, 12, respectively. Front and rear edge portions 33, 34 of the corrugated sheet 30 are connected to the first and second crossmembers 21, 22, respectively.

A left reinforcing plate 43 is disposed in a substantially rectangular space 42 formed by a left side sill 40, the left floor frame member 11, the first crossmember 21 and the second crossmember 22.

A right reinforcing plate 45 is disposed in a substantially rectangular space 44 formed by a right side sill 41, the right floor frame member 12, the first crossmember 21 and the second crossmember 22.

A second corrugated sheet 132 in a wave form is disposed in a substantially rectangular space 131 formed by the left and right floor frame members 11, 12, the second crossmember 22, and a fourth crossmember 24, having ridges oriented longitudinally. In this embodiment, the third crossmember 23 in the first embodiment shown in FIG. 1 is eliminated. For correspondence with the first embodiment in FIG. 1, the crossmember 24 is given the ordinal number "fourth" instead of "third" in description.

Left and right side portions 133, 134 of the second corrugated sheet 132 are connected to the left and right floor frame members 11, 12. Front and rear edge portions 135, 136 of the second corrugated sheet 132 are connected to the second and fourth crossmembers 22, 24, respectively.

A left reinforcing plate 139 is disposed in a substantially rectangular space 138 formed by the left side sill 40, the left floor frame member 11, the second crossmember 22 and the fourth crossmember 24.

A right reinforcing plate 141 is disposed in a substantially rectangular space 140 formed by the right side sill 41, the right floor frame member 12, the second crossmember 22 and the fourth crossmember 24.

A third corrugated sheet 144 in a wave form is disposed in a substantially rectangular space 143 formed by the left and right floor frame members 11, 12, the fourth crossmember 24 and a fifth crossmember 25, having ridges oriented longitudinally.

Left and right side portions 145, 146 of the third corrugated sheet 144 are connected to the left and right floor frame members 11, 12. Front and rear edge portions 147, 148 of the third corrugated sheet 144 are connected to the fourth and fifth crossmembers 24, 25, respectively.

Front and rear end portions 16, 17 of a floor panel 15 are connected to the first and fifth crossmembers 21, 25, respectively. Left and right edge portions 18, 19 of the floor panel 15 are connected to the left and right side sills 40, 41, respectively.

In this manner, the vehicle floor structure 130 in the fourth embodiment uses more corrugated sheets than the vehicle floor structure 10 in the first embodiment, further increasing rigidity. A large load F exerted on the right floor frame member 12 of the vehicle floor structure 130 is more effectively dispersed to be received by the left and right floor frame members 11, 12, and the floor panel 15 and the three corrugated sheets 30, 132 and 144 located therebetween. If the right floor frame member 12 is reduced in strength to some degree, the right floor frame member 12 is still prevented from deformation.

Now, a vehicle floor structure 150 according to a fifth embodiment of the present invention will be described with reference to FIGS. 17, 18A and 18B. Components identical to those in the first embodiment are given the identical symbols and will not be described.

In this embodiment, a floor panel 151 corresponds to the floor panel 15 in the first embodiment turned upside down, and left and right floor frame members 152, 153 correspond to the left and right floor frame members 11, 12 in the first embodiment turned upside down. A first to seventh crossmembers used in this embodiment correspond to the first to seventh crossmembers 21, 22, 23, 24, 25, 26 and 27 merely turned upside down, and the symbols shown in FIG. 1 are used therefor. A corrugated sheet 154 corresponds to the corrugated sheet 30 in the first embodiment turned upside down.

Figure 17:
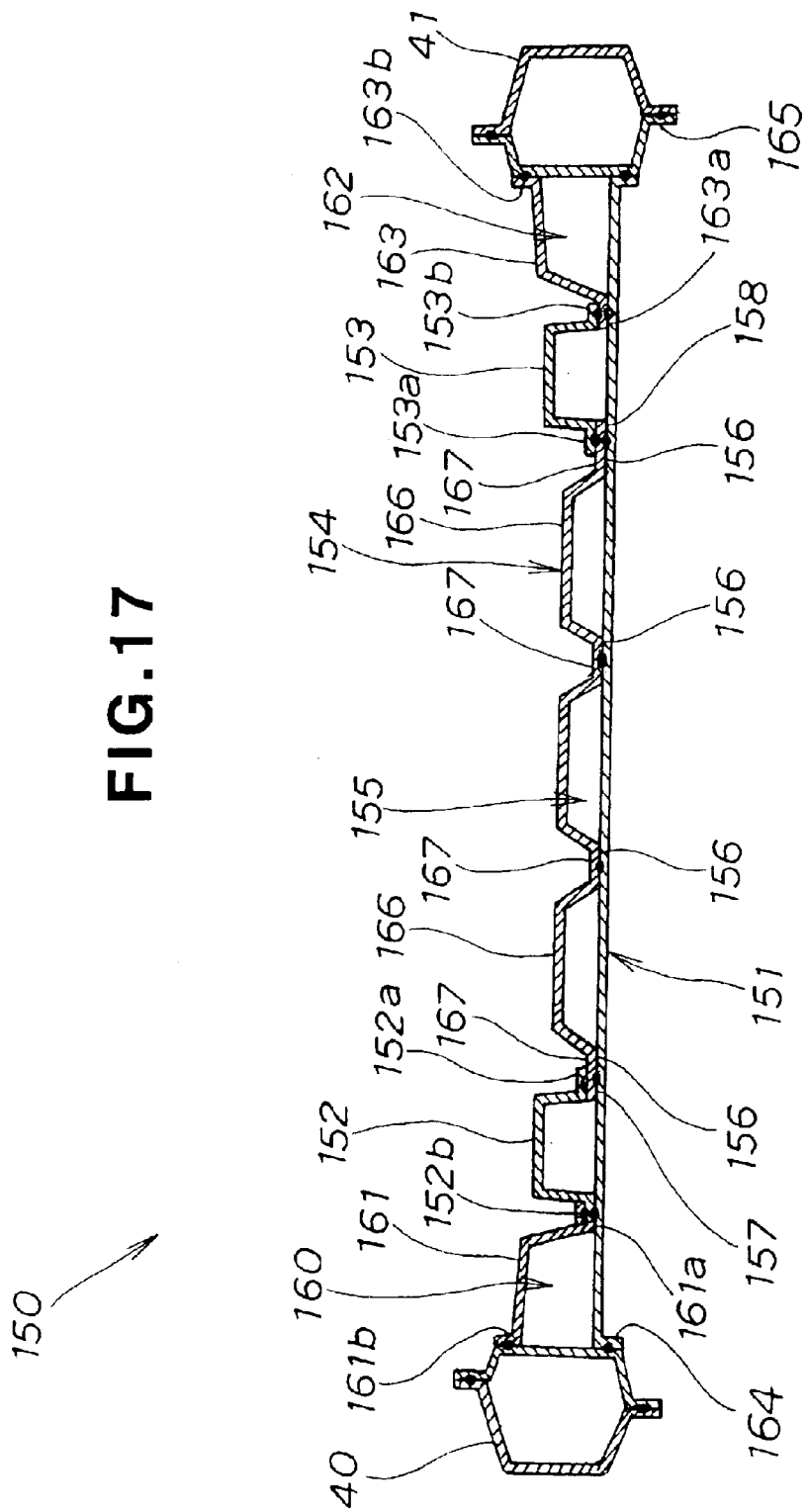
FIG. 17 is a cross-sectional view of a vehicle floor structure according to a fifth embodiment of the present invention.

Referring to FIG. 17, in the vehicle floor structure 150 in the fifth embodiment, the left and right floor frame members 152, 153, the first to seventh crossmembers 21 to 27, and the corrugated sheet 154 with a plurality of downward facing ridges (bottom ridges) 156 elongated longitudinally are placed on top of the floor panel 151 by spot welding, for example.

The corrugated sheet 154 is disposed in a space 155 between the left and right floor frame members 152, 153, and the ridges 156 of the corrugated sheet 154 are connected to the floor panel 151 by spot welding, for example.

When the ridges 156 at left and right side portions 157, 158 of the corrugated sheet 154 are connected to the floor panel 151, inside lower edges 152a, 153a of the left and right floor frame members 152, 153 are connected to the ridges 156 at the left and right side portions 157, 158.

A left reinforcing plate 161 is disposed in a space 160 formed between the left floor frame member 152 and a left side sill 40. An inside lower edge 161a of the left reinforcing plate 161 is connected to the floor panel 151 by spot welding, for example. An outside edge 161b of the left reinforcing plate 161 is connected to the left side sill 40 by spot welding, for example.

When the inside lower edge 161a of the left reinforcing plate 161 is connected to the floor panel 151, the inside lower edge 161a of the left reinforcing plate 161 is connected to an outside lower edge 152b of the left floor frame member 152. The left reinforcing plate 161 is a member bent substantially in a dogleg for increased strength.

A right reinforcing plate 163 is disposed in a space 162 formed between the right floor frame member 153 and a right side sill 41. An inside lower edge 163a of the right reinforcing plate 163 is connected to the floor panel 151 by spot welding, for example. An outside edge 163b of the right reinforcing plate 163 is connected to the right side sill 41 by spot welding, for example.

When the inside lower edge 163a of the right reinforcing plate 163 is connected to the floor panel 151, the inside lower edge 163a of the right reinforcing plate 163 is connected to an outside lower edge 153b of the right floor frame member 153. The right reinforcing plate 163 is a member bent substantially in a dogleg for increased strength.

A left side portion 164 of the floor panel 151 is connected to the left side sill 40 by spot welding, for example. A right side portion 165 of the floor panel 151 is connected to the right side sill 41 by spot welding, for example.

The corrugated sheet 154 includes three raised strips 166 and four grooves 167. The numbers of the raised strips 166 and grooves 167 are not limited thereto and may be desirably set to change the strength of the corrugated sheet 154 as desired.

The vehicle floor structure 150 in the fifth embodiment provides effects as described with reference to FIGS. 18A and 18B.

Figure 18A:
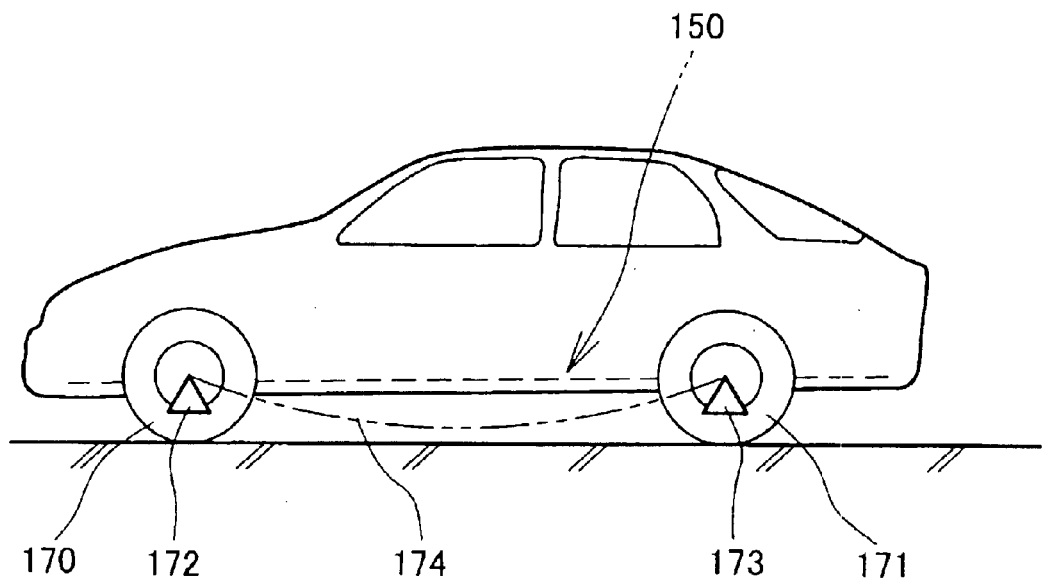
FIGS. 18A and 18B are diagrams illustrating an exertion of force to the vehicle floor structure according to the fifth embodiment.

Referring to FIG. 18A, the vehicle floor structure 150 in the fifth embodiment is supported in the vicinities of axles of front and rear wheels 170, 171 and can be deformed downward in a curve (shown by imaginary lines 174) on supporting points 172, 173 in the vicinities of the axles of the front and rear wheels 170, 171.

Figure 18B:
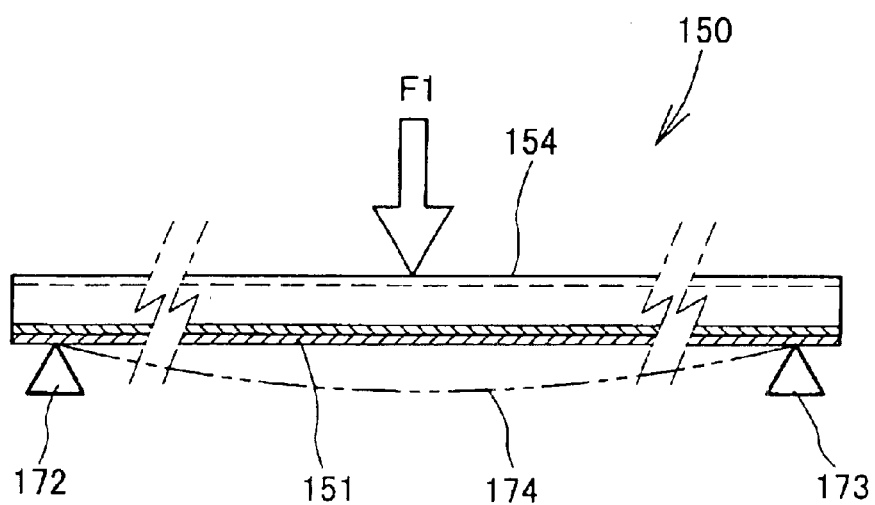
Figure 19:
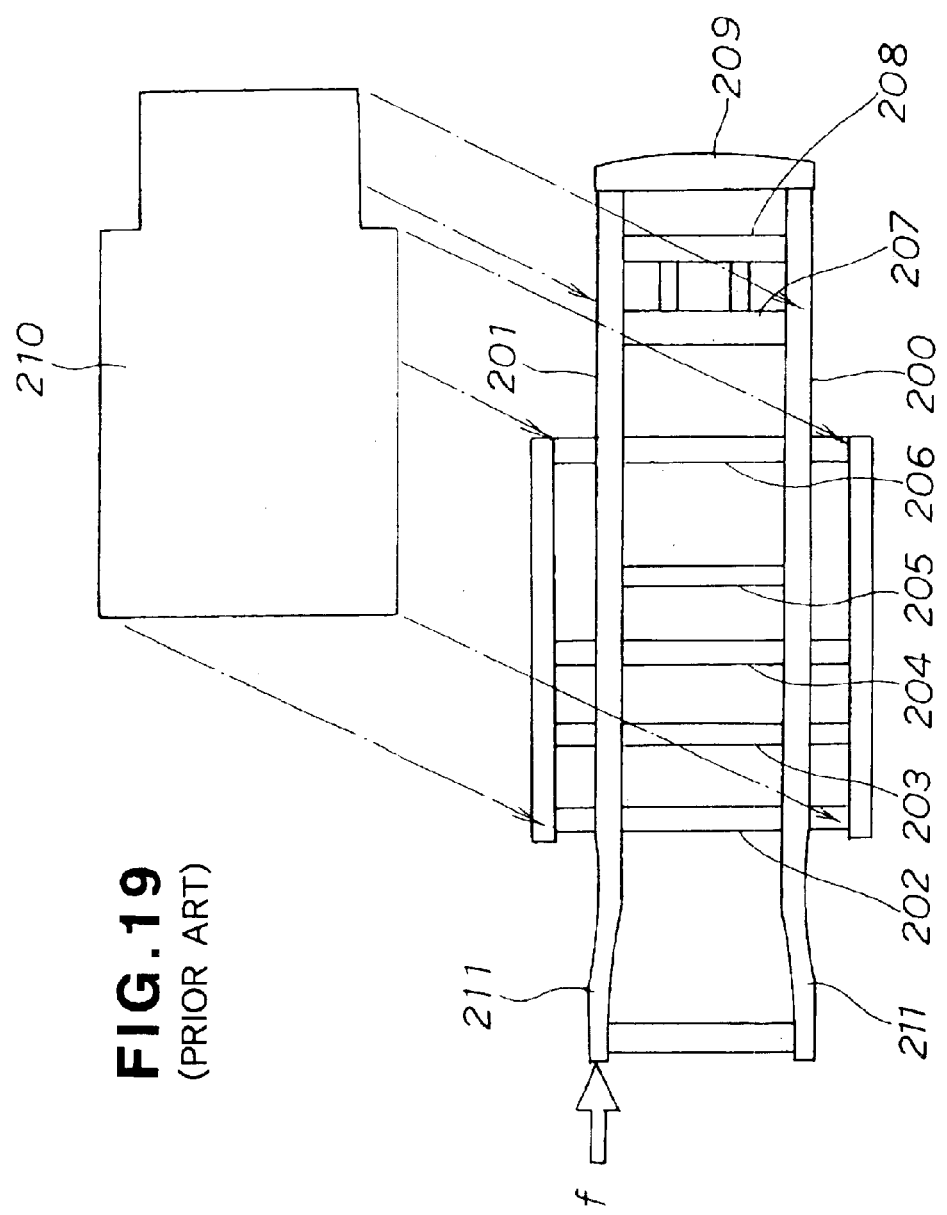
FIG. 19 is a plan view of a conventional vehicle floor structure.
Figure 20A:
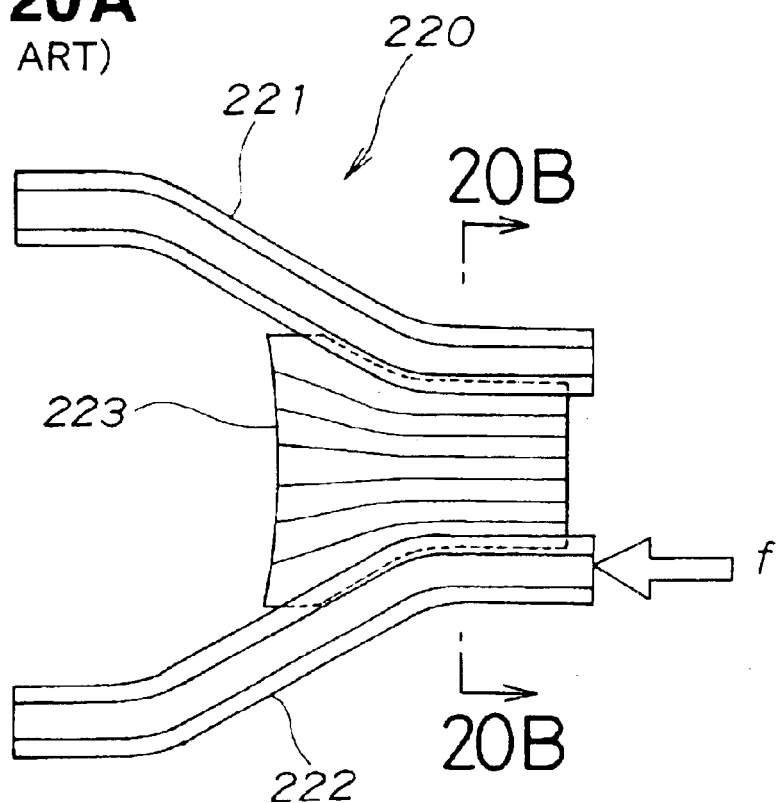
FIG. 20A is a plan view illustrating an exertion of force to the conventional vehicle floor structure.
Figure 20B:
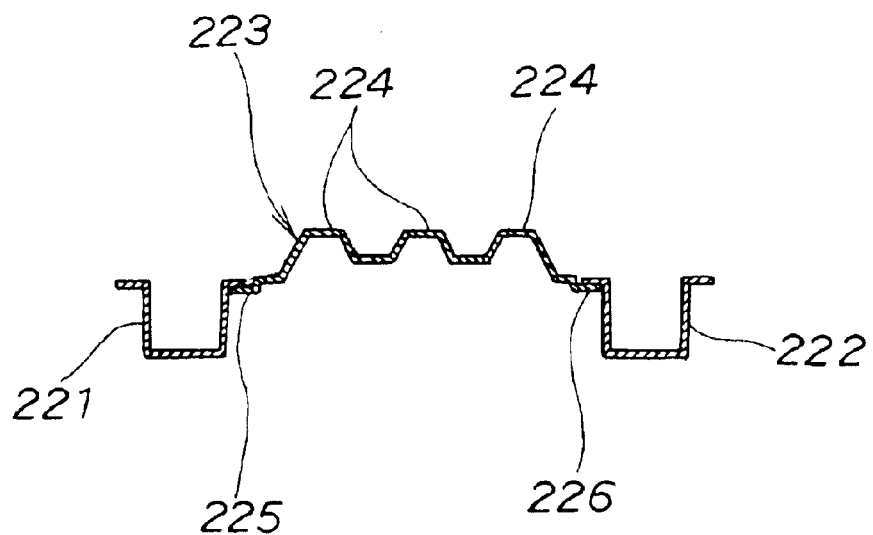
FIG. 20B is a cross-sectional view taken along line 20B—20B in FIG. 20A.

Referring to FIG. 18B, the corrugated sheet 154 in the vehicle floor structure 150 is a member in a wave form and has a higher longitudinal bending strength than the floor panel 151. For this reason, the vehicle floor structure 150 in the fifth embodiment has the corrugated sheet 154 with the raised strips 166 oriented longitudinally, disposed on top of the floor panel 151.

If a load F1 is imposed on the vehicle floor structure 150 as shown by an arrow and the vehicle floor structure 150 is deformed in a curve (shown by the imaginary lines 174), the vehicle floor structure 150 can have increased bending strength by the corrugated sheet 154 having higher strength provided at the compressed side. The vehicle floor structure 150 in the fifth embodiment can thus be further reduced in weight while maintaining the strength of the left and right floor frame members 152, 153 (see FIG. 17).

The corrugated sheets 30, 61, 66, 81, 102, 132, 144 and 154 described in the above several embodiments are not limited to the uneven shapes and the shapes may be desirably determined.

Obviously, various minor changes and modifications of the present invention are possible in the light of the above teaching. It is therefore to be understood that within the scope of the appended claims the invention may be practiced otherwise than as specifically described.

What is claimed is:

1. A floor structure comprising:

left and right floor frame members;

a plurality of crossmembers extended between the left and right floor frame members at predetermined longitudinal intervals;

a floor panel mounted to the left and right floor frame members and the crossmembers; and a corrugated sheet of wave form having a plurality of longitudinally oriented ridges disposed in a substantially rectangular space formed by the left and right floor frame members and opposite ones of the crossmembers, left and right side portions of the corrugated sheet being connected to the left and right floor frame members, respectively, front and rear edge portions of the corrugated sheet being connected to the opposite crossmembers, the ridges of the corrugated sheet being connected to the floor panel, wherein the floor panel is mounted on top of the left and right floor frame members and the crossmembers.

2. A floor structure according to claim 1, wherein the ridges of the corrugated sheet are upward-protruded portions.

3. A vehicle floor structure comprising:

left and right floor frame members;

a plurality of crossmembers extended between the left and right floor frame members at predetermined longitudinal intervals;

a floor panel mounted to the left and right floor frame members and the crossmembers, the floor panel having front and rear end portions connected to front and rear crossmembers, respectively, of the plurality of crossmembers; and a corrugated sheet of wave form having a plurality of longitudinally oriented ridges disposed in a substantially rectangular space formed by the left and right floor frame members and opposed crossmembers, the corrugated sheet having left and right side portions connected to the left and right floor frame members, respectively, and front and rear edge portions connected to the front and rear crossmembers, respectively, the ridges of the corrugated sheet being connected to the floor panel, wherein the front and rear crossmembers each have a U-shaped cross-section and include a bottom disposed horizontally, a front wall extending vertically upward from a front edge of the bottom, a rear wall extending vertically upward from a rear edge of the bottom, and front and rear flat flanges formed at upper ends of the front and rear walls, respectively, the front and rear edge portions of the corrugated sheet are each connected to the bottom of a respective one of the front and rear crossmembers of the U-shaped cross-sections, and the front and rear end portions of the floor panel are each connected to the front and rear flat flanges of a respective one of the front and rear crossmembers of the U-shaped cross-section.

4. A floor structure according to claim 3, wherein the corrugated sheet has a plurality of alternate raised strips and flat portions disposed transversely thereof, each of the raised strips having an upper surface forming a respective one of the ridges and left and right side walls connected together by the ridge, each of the front and rear edge portions of the corrugated sheet having a first step formed in the ridge of each of the raised strips, left and right flat flaps formed at an end of the left and right side walls of each raised strip, and a second step formed at an end of each of the flat portions, the first step being in abutment with a rear surface of one of the front and rear flat flanges of the front or the rear crossmember, the flat flaps being in abutment with one of the front and rear walls of the front or the rear crossmember, and the second step being in abutment with the bottom of the front or the rear crossmember.

* * * * *